United States Patent [19]

Krisher et al.

[11] Patent Number: 4,488,255
[45] Date of Patent: Dec. 11, 1984

[54] PROCESSING REGISTER APPARATUS FOR USE IN DIGITAL SIGNAL PROCESSING SYSTEMS

[75] Inventors: Dale L. Krisher; Sirus Chitsaz, both of Raleigh, N.C.

[73] Assignee: International Telephone and Telegraph Corporation, New York, N.Y.

[21] Appl. No.: 313,916

[22] Filed: Oct. 22, 1981

[51] Int. Cl.³ ............................ G06F 3/00; G06F 5/00
[52] U.S. Cl. .................................................... 364/900
[58] Field of Search ............................... 364/200, 900

[56] References Cited

U.S. PATENT DOCUMENTS

| | | | |
|---|---|---|---|
| 4,130,883 | 12/1978 | Hazelton | 364/900 |
| 4,291,374 | 9/1981 | Dlugos | 364/567 |
| 4,374,429 | 2/1983 | Cannon et al. | 364/900 |

*Primary Examiner*—Gareth D. Shaw
*Assistant Examiner*—John G. Mills
*Attorney, Agent, or Firm*—John T. O'Halloran; Jeffrey P. Morris; Thomas F. Meagher

[57] ABSTRACT

There is described a processing register particularly adapted for use in digital processing systems to implement various digital functions as high order digital filters and other structures which presently require complicated integrated circuit arrangements.

The processing register operates in five modes which are a shift register mode with multiple fixed delays, a shift register with multiple fixed delays and a time slot interchanger, a shift register mode with an alternating word pair interchanger, a programmable delay shift register and as a discrete fourier transform preprocessing module.

The processing register is particularly adaptable to operate with a high speed multiplier to implement various digital processing functions. In order to accommodate mode operation the processing register contains a main shift register and a computation register which are under the control of a control register which register accepts a control input word having bits thereof indicative of a particular mode of operation.

The processing register further includes an independent storage register which shares overflow operation with the main storage register and which register can also be controlled by the control word during certain of the above described modes of operation. In order to provide flexibility the processing register contains a 1 to 2 multiplexer which is programmable according to the status of a second control word. The multiplexer register can operate in conjunction with the main and independent registers during certain other modes of operation. In order to accommodate the multiple modes of operation there is further included a sum and difference register whose inputs can be selected during mode operation to enable one to couple sum and difference digital signals to the multiplexer or to the inputs of the main and independent storage registers.

In the configuration described data computation and control of the processing register is synchronized with the clock input and a word sync signal which signals define the relationship of all operations and thus enable one to perform complicated digital functions in a simple and reliable manner.

18 Claims, 24 Drawing Figures

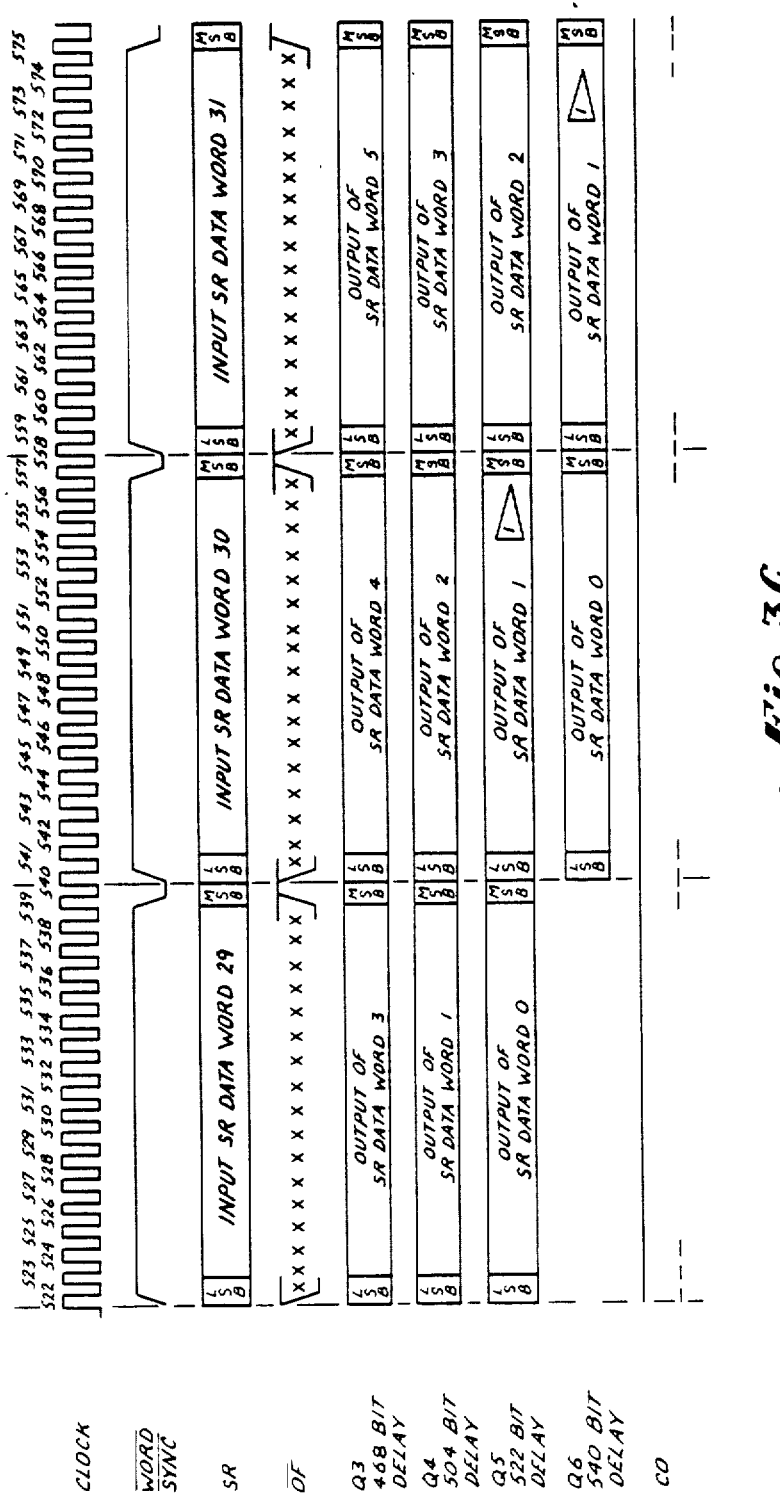

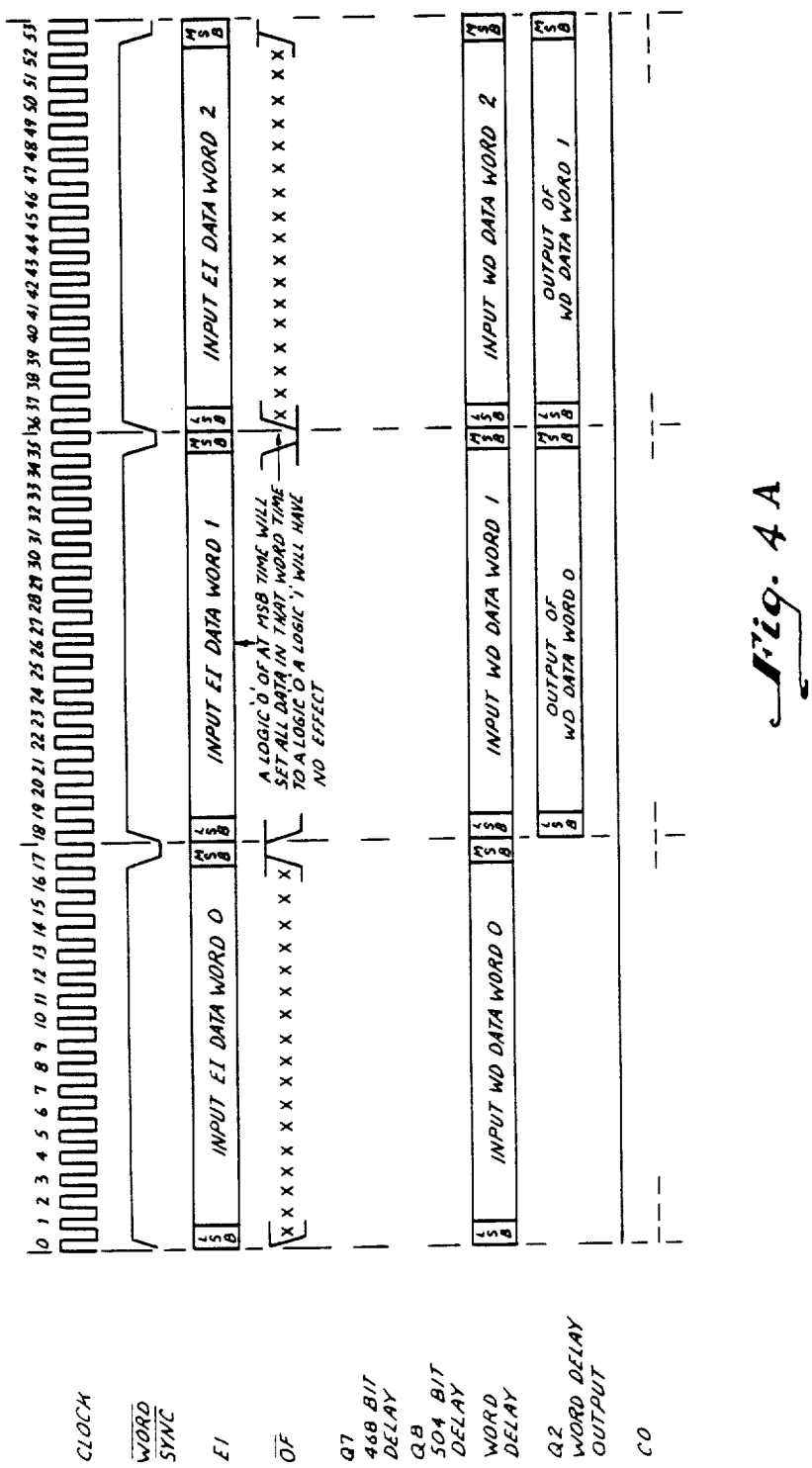

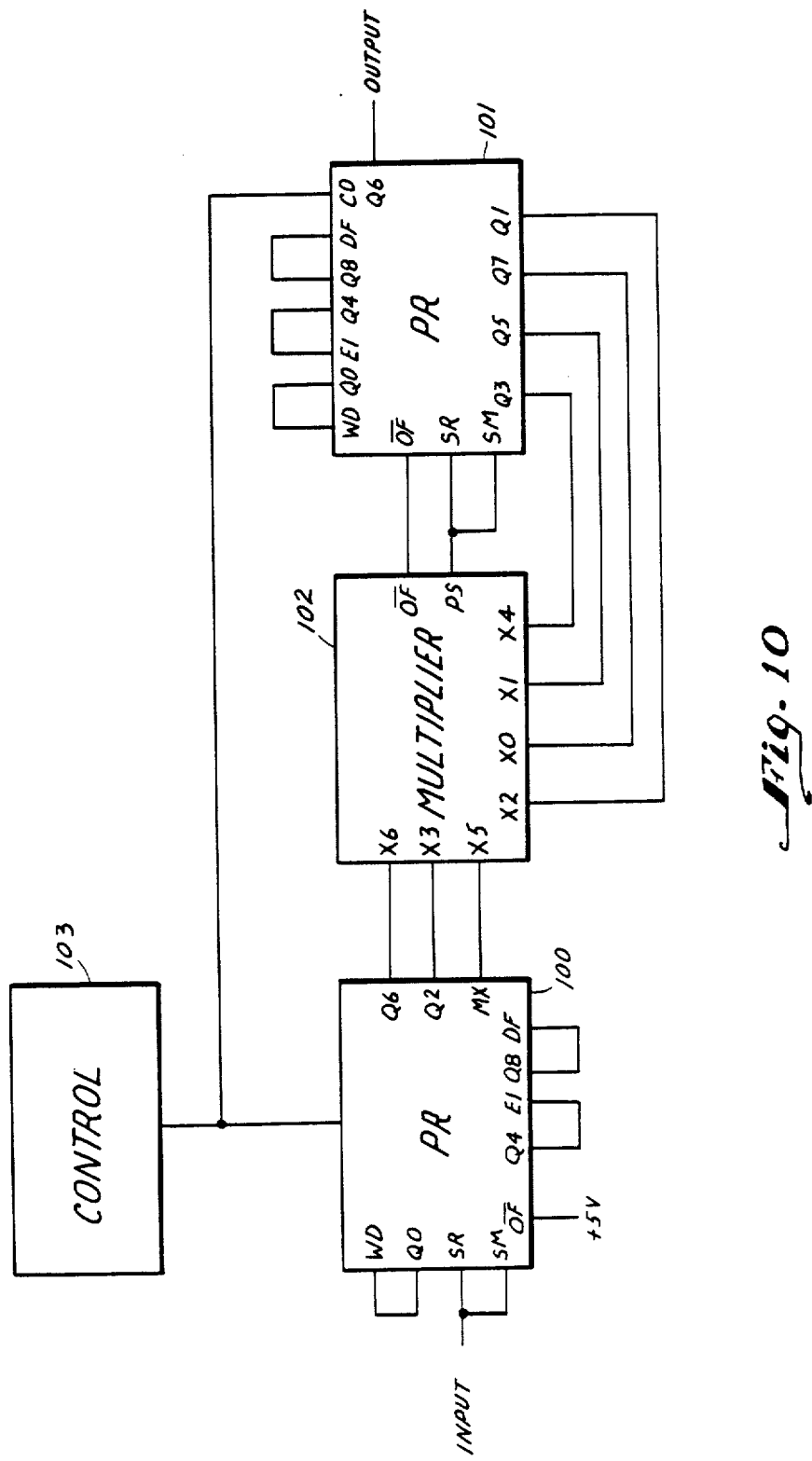

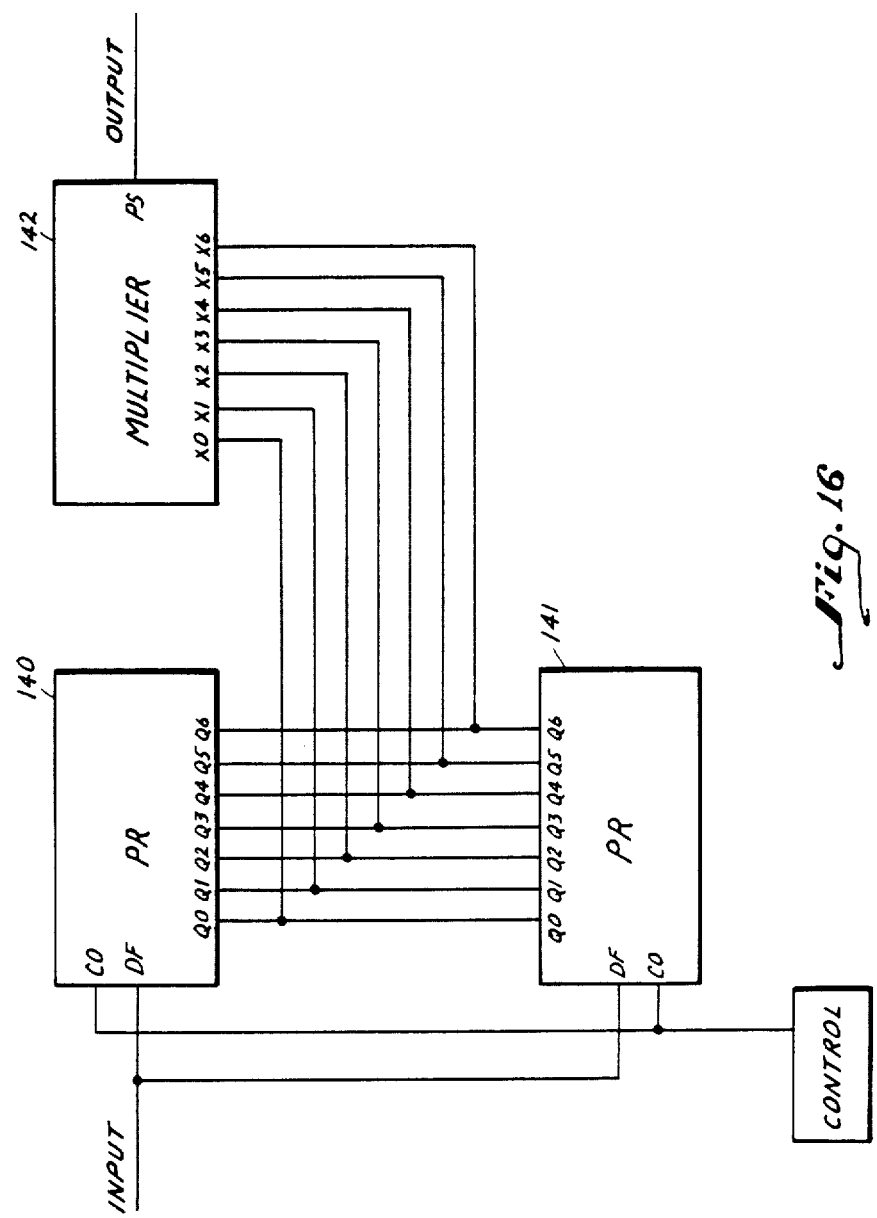

PROCESSING REGISTER APPARATUS FOR USE IN DIGITAL SIGNAL PROCESSING SYSTEMS

TABLE OF CONTENTS

ABSTRACT OF DISCLOSURE
BACKGROUND OF INVENTION
DESCRIPTION OF THE PREFERRED EMBODIMENT
BRIEF DESCRIPTION OF THE DRAWINGS
BASIC DIGITAL SIGNAL PROCESSING CONFIGURATIONS
DETAILED DESCRIPTION OF THE INVENTION
THE SHIFT REGISTER MODE (SR MODE)
  General and detailed description
THE SHIFT REGISTER MODE WITH TIME SLOT INTERCHANGER (TSI MODE)
  General and specific description
TABLE 1—TSI CONTROL WORDS
SHIFT REGISTER WITH ALTERNATING WORD PAIR INTERCHANGER (AWPI MODE)
  General and specific description
PROGRAMMABLE DELAY SHIFT REGISTER MODE (PDSR MODE)
TABLE 2—PROGRAMMABLE DELAY CONTROL WORDS
DISCRETE FOURIER TRANSFORM PREPROCESSING MODE (DFT MODE)
THE CLAIMS

BACKGROUND OF INVENTION

This invention relates to digital signal processing apparatus in general, and more particularly, to a processing register for use in digital signal processing systems.

It has long been recognized that many future products in the telecommunications field would operate based upon digital signal processing. By digitally processing data such as voice, video, radar, sonar and other signals, one can achieve greater reliability and lower cost as digital circuits are, in most cases, easier to integrate and produce than their analog counterparts.

In general, digital signal processing is based, upon multiplication, summation, subtraction and storage of digital data and by performing these functions upon digital signals many useful devices can be implemented in a telecommunications system. The prior art is replete with a number of patents and technical articles relating to digital signal processing techniques and systems employing such techniques.

A powerful combination for performing digital signal processing is the combination of a high speed multiplier operating in conjunction with a processing register. The function of the multiplier is to perform multiplication and accumulation of data applied to its inputs. The multiplier may be a programmable device and may operate on digital data streams at the inputs to provide a sum of products. There are many examples of multipliers in the prior art.

The processing register is a device which can perform the remaining arithmetic operations such as summation, subtraction and delay.

The prior art attempted to implement processing register construction by the use of a large number of integrated circuit chips as well as custom components which varied and changed according to the application. This leads to great difficulty in implementing digital processing systems in regard to cost, reliability and power consumption.

To provide this utility and to be able to accomodate these functions, the processing register must be versatile and may provide a number of different operating modes to accomodate a host of diverse applications. It should also be simple to operate and use.

These criterion and others dictate that the structure and architecture of such a unit be amenable to providing a wide host of functions and that the unit might be capable of operation in various modes to enable the system designer to employ the register as desired.

Particularly useful functions for the combination of a processing register and a multiplier is the utilization of these devices to implement digital filters and discrete Fourier transforms. With the processing registers versatility discrete Fourier transforms, Finite Impulse Response Filters (FIR filters), or Infinite Impulse Response Filters (IIF filters) are examples of digital signal processing configurations which can be implemented.

This utility enables the digital system engineer to implement various operations and devices such as digital hybrids, adaptive equalizer systems, echo cancellation systems, stand alone signaling systems, digital filters, spectrum analysis, correlation, speech analysis and a host of other functions.

It is therefore an object of the present invention to provide an improved processing register for use in digital signal processing which is capable of providing the ability to operate in a wide number of applications for the selective processing of digital signals.

DECRIPTION OF THE PREFERRED EMBODIMENT

A processing register apparatus for use in digital signal processing applications, said register capable of operating in a plurality of different modes, comprising a main shift register means having a plurality of stages for receiving and storing therein a given number of bits manifesting a plurality of digital data words each having a smaller number of bits of a given value, said register adapted to receive at an input a digital data signal manifesting said plurality of digital data words, and to provide said words at an output, control register means coupled to said main register means having a plurality of stages equal to the number of bits in a data word and adapted to receive a control word of said given value of bits, with predetermined selected first ones of said bits indicative of any one of given number of modes of operation for said first register and with predetermined selected second ones of said bits indicative of control signals for selecting any one stage of said main shift register manifesting a given delay from said input to output according to said selected stage, a second storage register having a plurality of stages for receiving and storing therein a different number of given bits than said main register, manifesting a smaller plurality of digital data words each of the same number of bits of said given value and overflow means coupled to said main and second registers to set said given value of bits indicative of any digital word stored to one binary logic value in either said main or second storage registers, mode selector means coupled to said control register and responsive to said first ones of said bits to provide a plurality of control signals indicative of a separate mode of operation for said processing register.

BRIEF DESCRIPTION OF THE DRAWINGS

FIGS. 3A to 3C are timing diagrams depicting operation of the main shift register.

FIGS. 4A to 4C are timing diagrams depicting operation of the independent storage register and word delay of the processing register.

BASIC DIGITAL SIGNAL PROCESSING CONFIGURATIONS

In order to gain a closer understanding of the operation of a processing register some concepts of digital filter design will be given to clarify the environment in which the processing register can operate. The basic concepts of digital filter design and implementation involve the following three steps: 1. Establish the necessary input-output relationship (Transfer Function) of a digital filter.

$$H(Z) \triangleq \frac{Y(Z)}{X(Z)} = \frac{\alpha \prod_{I=1}^{\pi} (1 - A_I Z^{-1})}{\prod_{J=1}^{N} (1 - P_J Z^{-1})}, X(Z) \text{ and } Y(Z)$$

are, respectively, the Z-transforms of the input and output sequences.

As an example, let $$H(Z) = \frac{C_1 + C_2 Z^{-1} + C_3 Z^{-2}}{1 - C_4 Z^{-1} - C_5 Z^{-2}}$$

Figure 5A:
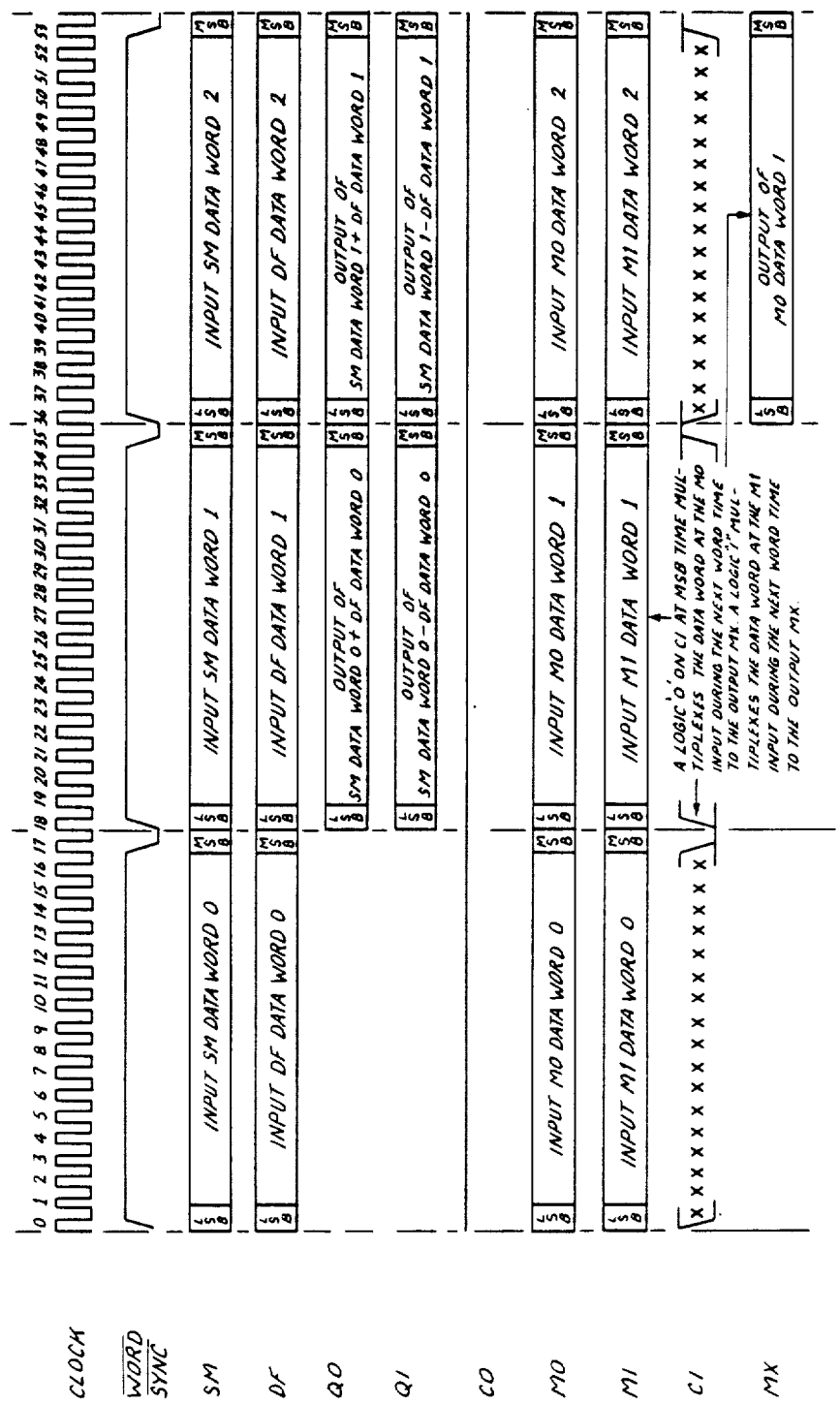
Figure 5B:
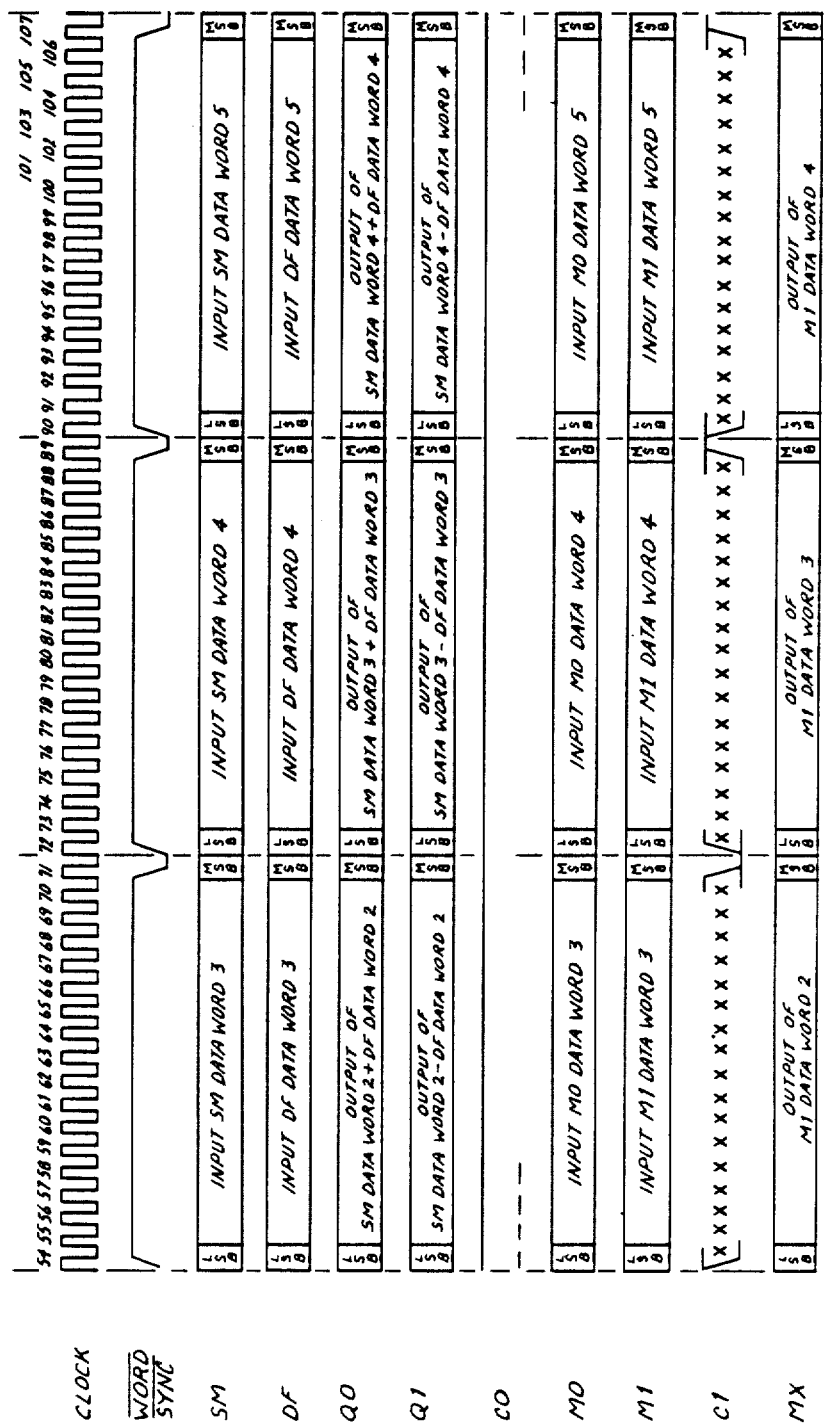

FIGS. 5A and 5B are timing diagrams depicting operation of the sum and difference register and multiplexer according to this invention.

Figure 6:
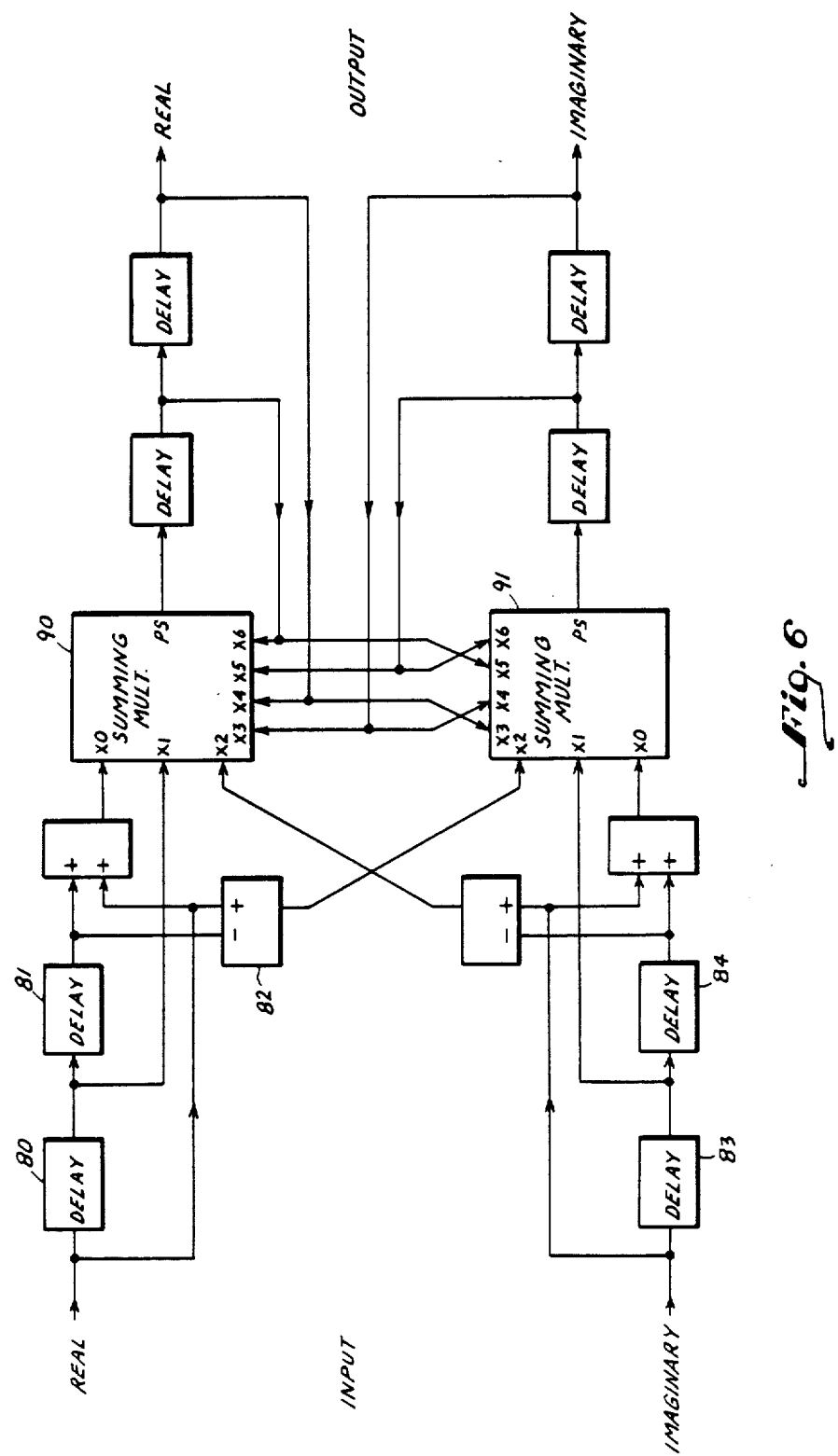

FIG. 6 is a block diagram of a complex Biquadratic filter section employing a processing register according to this invention.

Figure 7:
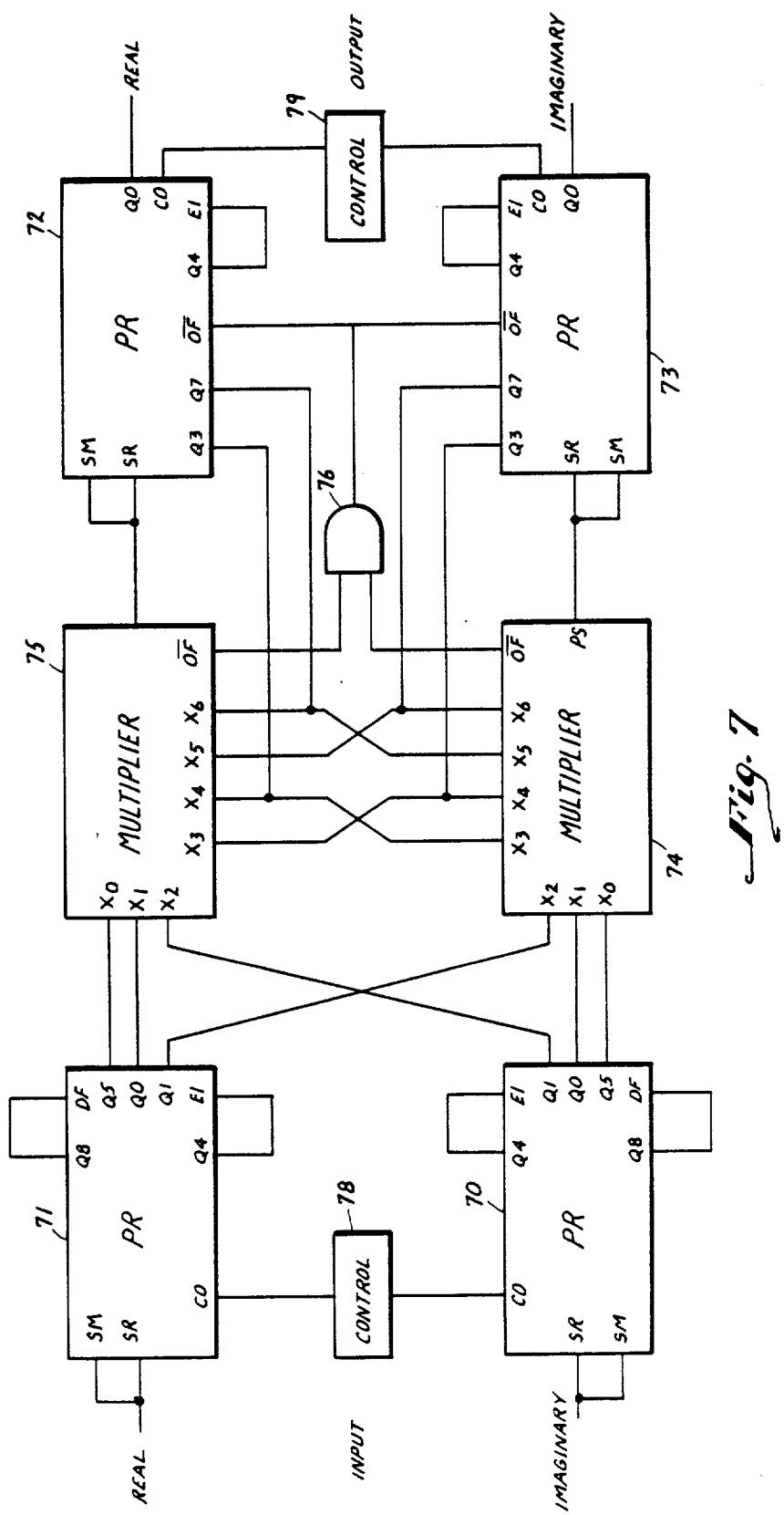

FIG. 7 is a block diagram showing a Biquadratic filter implemented using the processing register of this invention.

Figure 8:
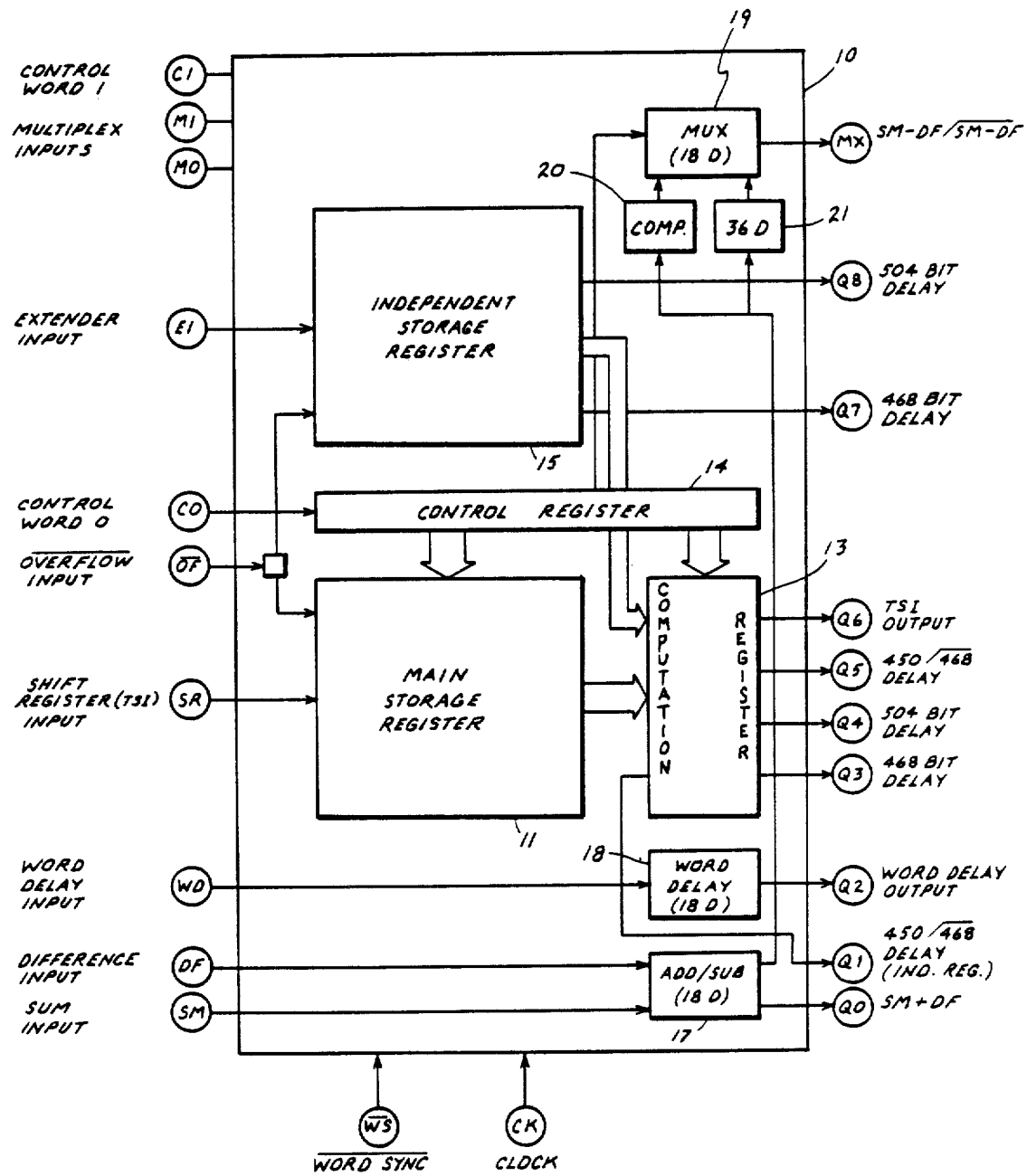

FIG. 8 is a block diagram depicting the processing register operating in an alternating word pair interchanger mode (AWPI).

FIGS. 9A to 9D are timing diagrams depicting operation in the AWPI mode.

FIG. 10 is a block diagram of a complex Biquadratic filter operating in the AWPI mode.

Figure 11:
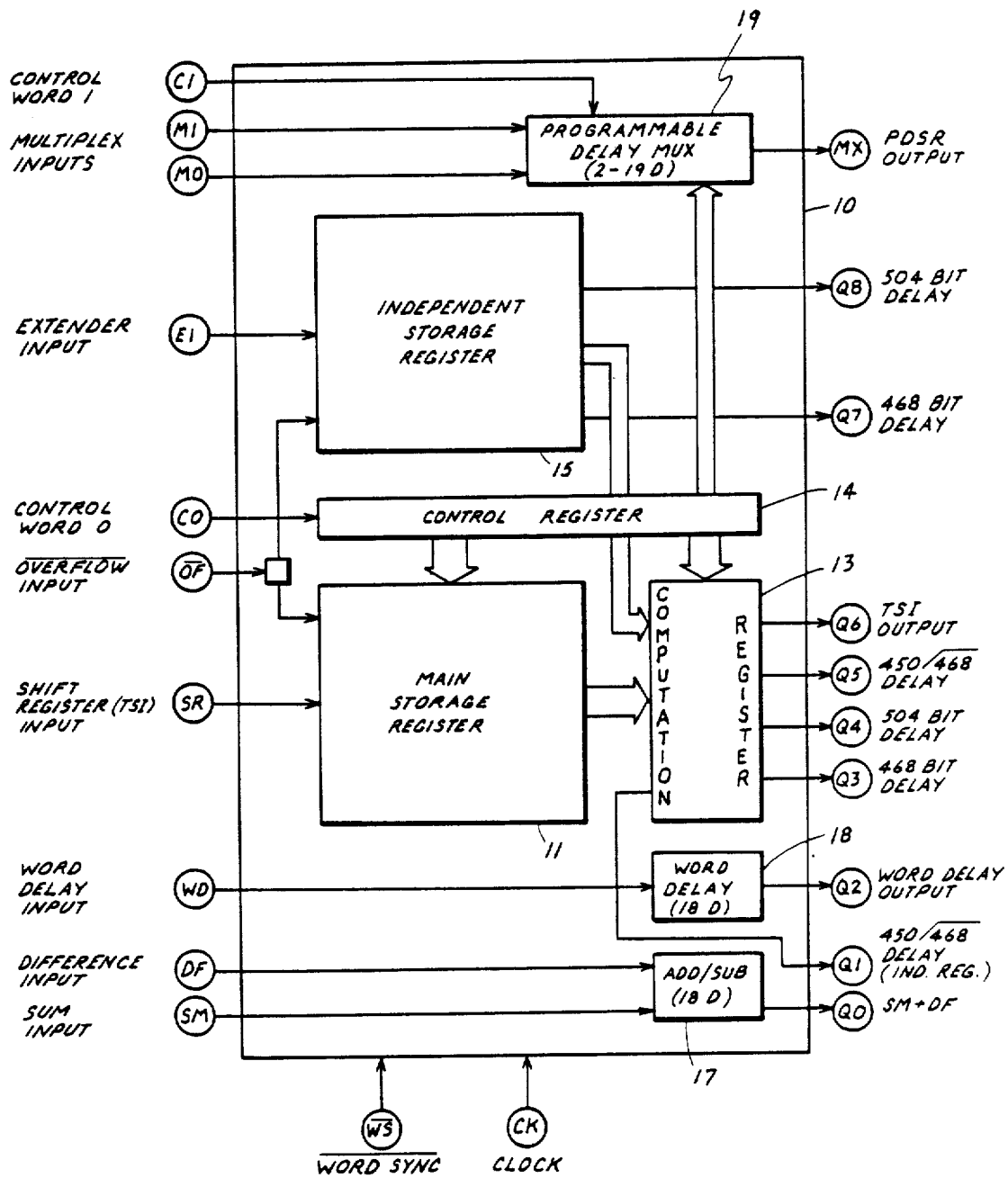

FIG. 11 is a block diagram depicting the processing register operating in a programmable delay shift register mode(PDSR).

Figure 12:
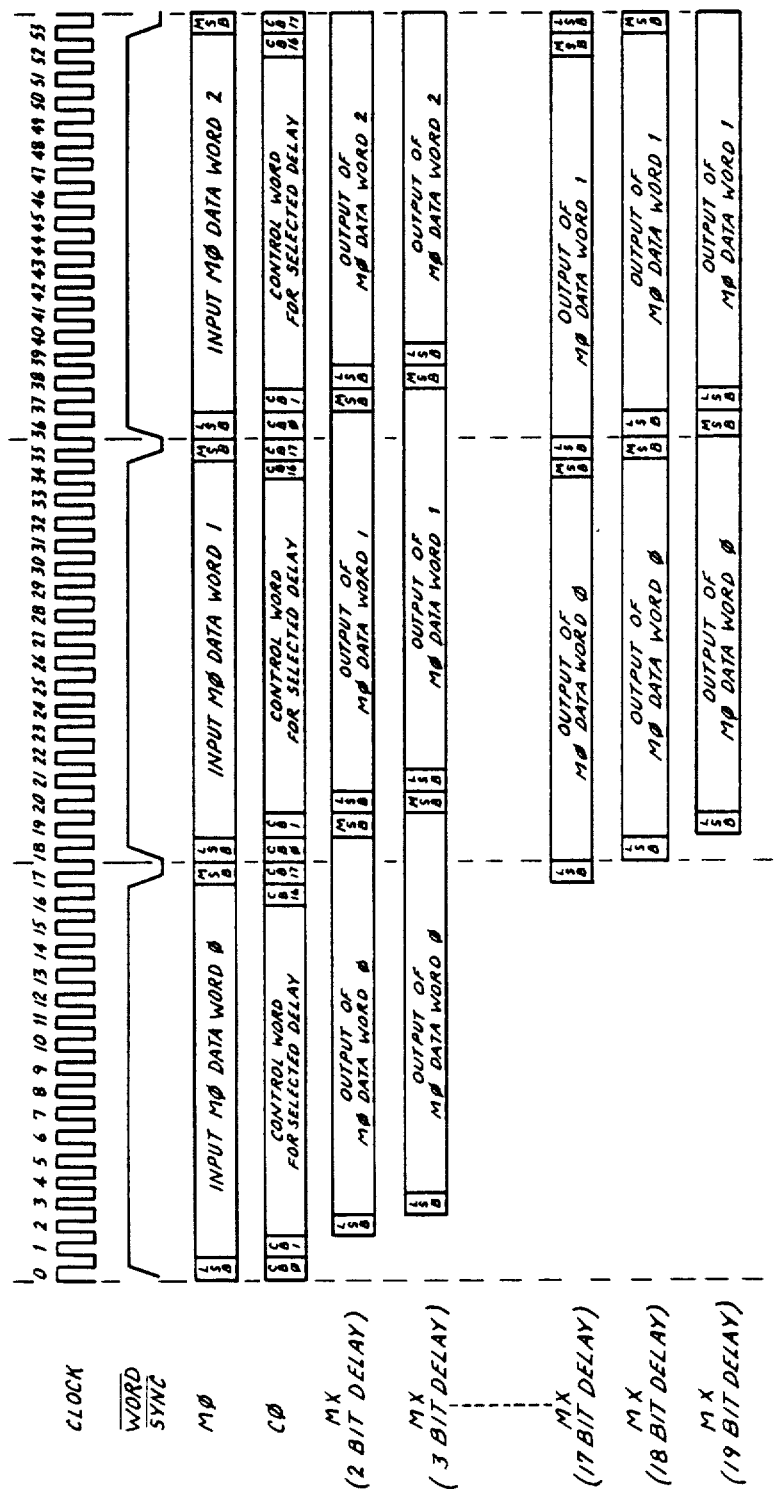

FIG. 12 is a timing diagram useful in explaining operation in the PDSR mode.

Figure 13:
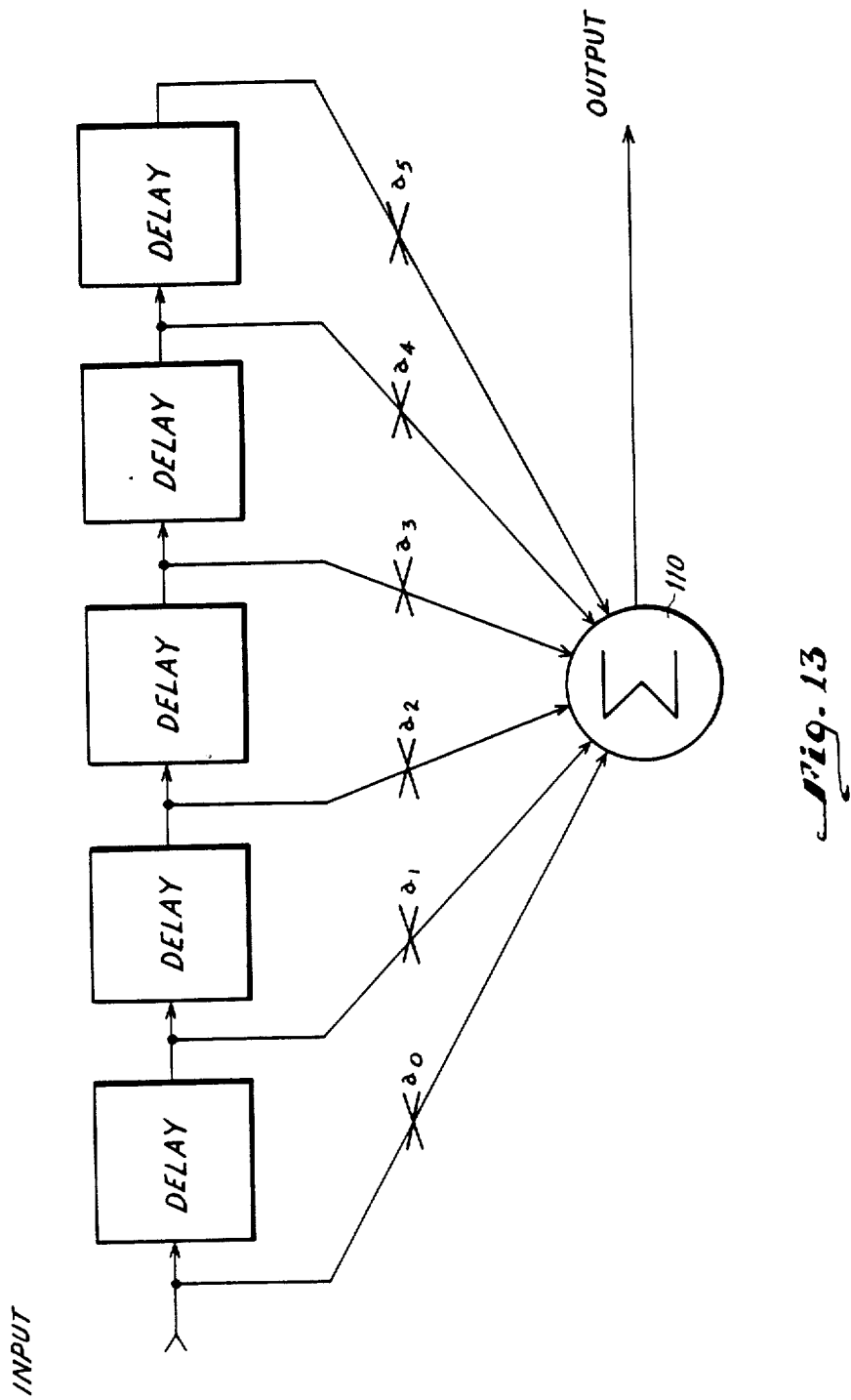

FIG. 13 is a block diagram of a Finite Impulse Response filter.

Figure 14:
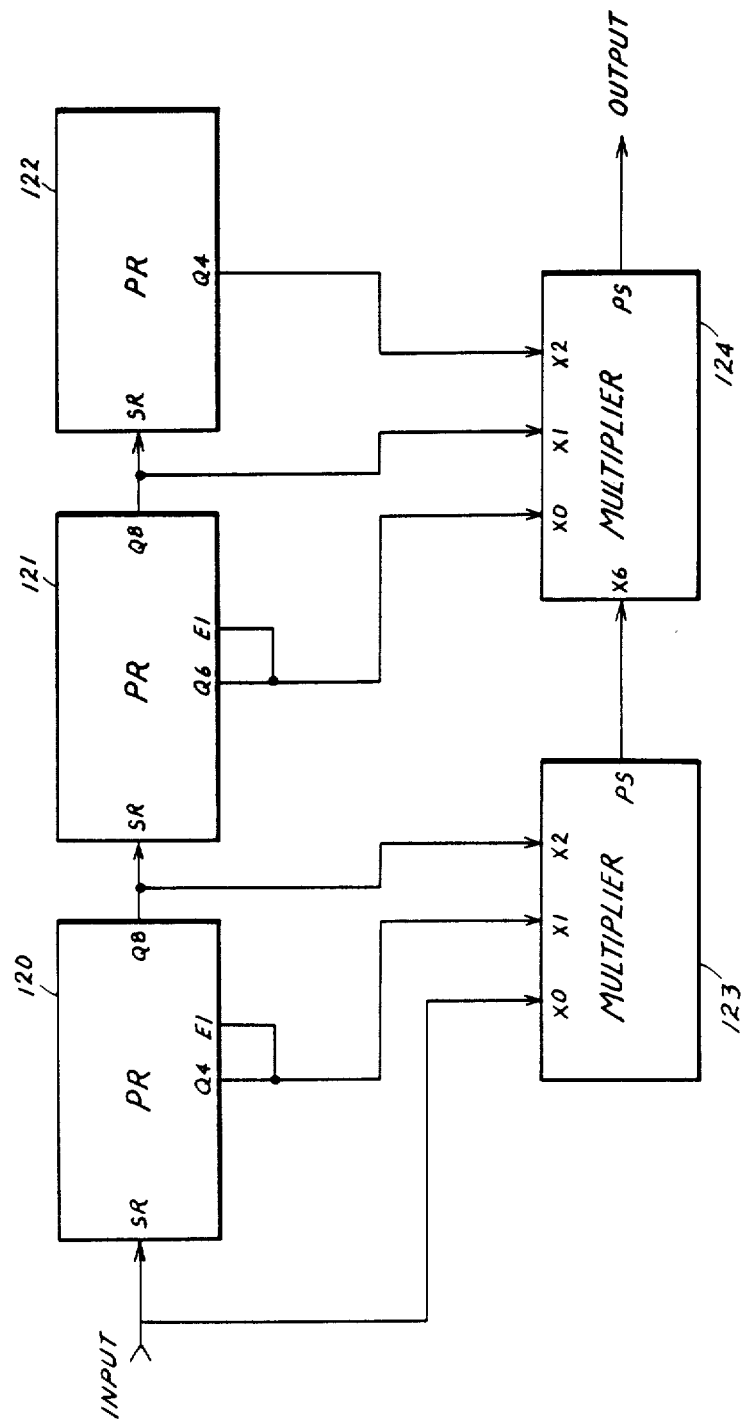

FIG. 14 is a block diagram of a Finite Impulse Response filter using the processing register of this invention.

Figure 15:
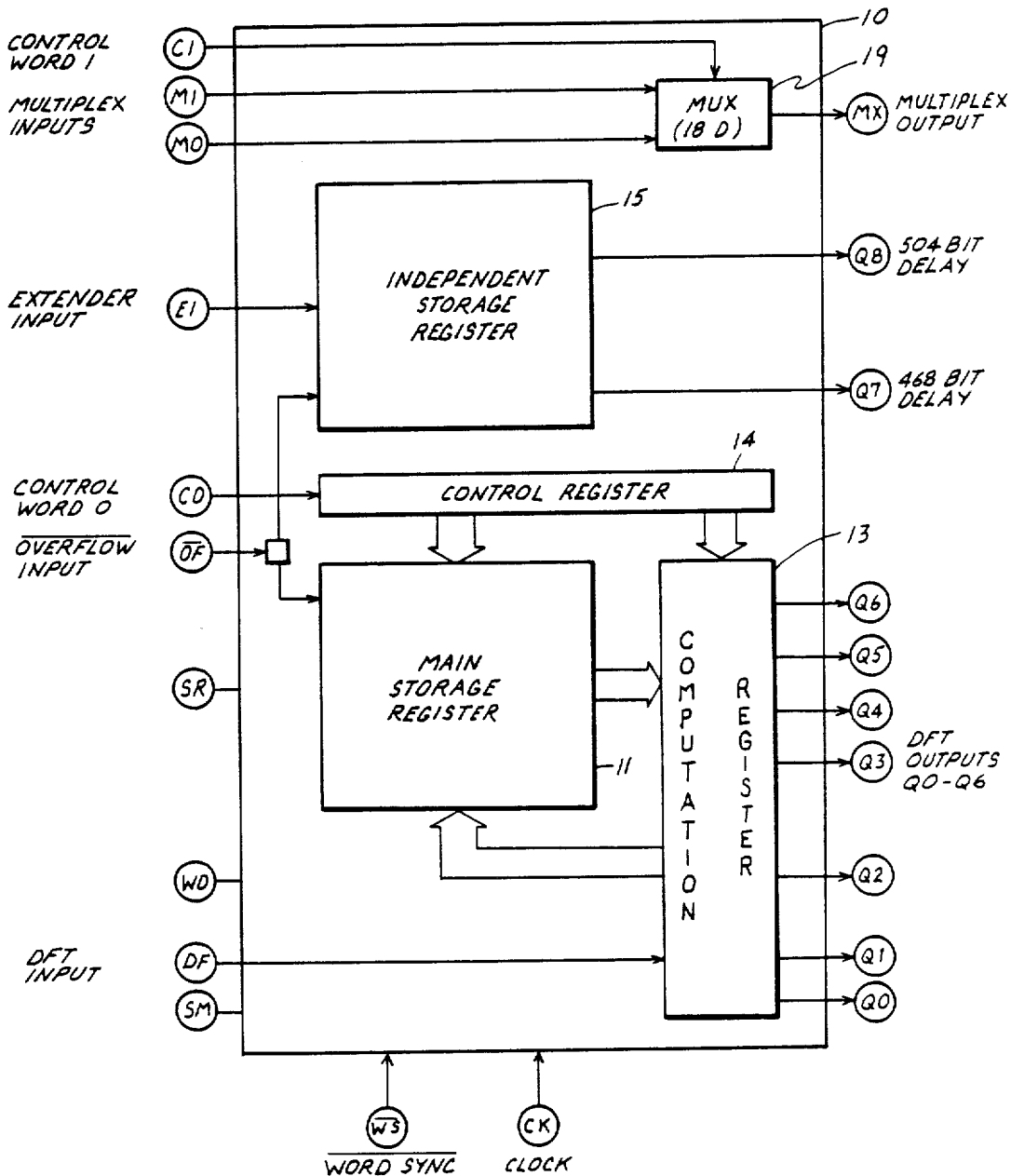

FIG. 15 is a block diagram depicting the processing register operating in a discrete fourier transform preprocessing mode (DFT).

FIG. 16 is a block diagram of a discrete fourier transform implementation using the processing register of this invention.

The C's are the coefficients needed to give the desired input-output relationship for a second order (Biquadratic) filter.

2. Convert the input-output relationship to an algorithm. The present output of a digital filter is an algebraically weighted sum of past output values and the present and past input values. In the exampled above,
$Y(N) = C_1 X(N) + C_2 X(N-1) + C_3 X(N-2) + C_4 Y(N-1) + C_5 Y(N-2)$ 3. Implement the algorithm in terms of digital hardware. Implementing the algorithm requires the following three basic components:
  (i) Shift registers or delay elements (to store past output and past input values).
  (ii) Multipliers (to provide the necessary weighting factors to the sampled values).
  (iii) Adders (to add up the various quantities to give the present output values).

Any filter whose transfer function, H(z) as defined previously, has $N \geq 1$ is called an infinite impulse response (IIR) Digital Filter. A filter with $N = 0$ is called a Finite Impulse Response (FIR) filter since the corresponding impulse response is of finite duration.

As will be explained the processing register (PR) of this invention is a solution to the problem of economically providing the hardware capable of being configured into the many necessary non-multiplicative components of different digital signal processing systems. Its unique architecture allows it to integrate the necessary ancilliary hardware functions to allow and a suitable multiplier, to efficiently implement many of the digital signal processing configurations. This versatility is embodied in the Processing Register's ability to provide a variety of different functions by simply programming it to perform the function desired and reconfiguring the interconnect.

The PR has five basic modes and each of these modes will be described in detail. A PR may be programmed by any suitable source. If its programming code will be unchanged over time, the permanent programming code may be placed in Read Only Memory (ROM). If changes are to be made in the code from time to time, the present code may be placed in Random Access Memory (RAM) where some type of controller can update the RAM contents at the controller's discretion. Also, in the PR's most basic modes, the device may be programmed by simply applying a logic level "1" to the control input, thereby allowing the device to assume a certain group of default internal control settings.

In the detailed description to follow various examples of circuit operation will be given by referring to timing diagrams which show the digital signals applied and operated on by each of the components described. It is of course understood that such timing diagrams are given by way of example only and in order to gain a clearer understanding of circuit operation. In a similar manner particular bit delays as well as word length in regard to the number of bits contained in the control words or input digital words are given. It is of course understood that these are given as only by way of an example and that the bit length as well as the various delays can be modified accordingly. It will be understood that it is the architecture of the processing register which is the main aspect of this invention.

DETAILED DESCRIPTION OF THE INVENTION

Figure 1:
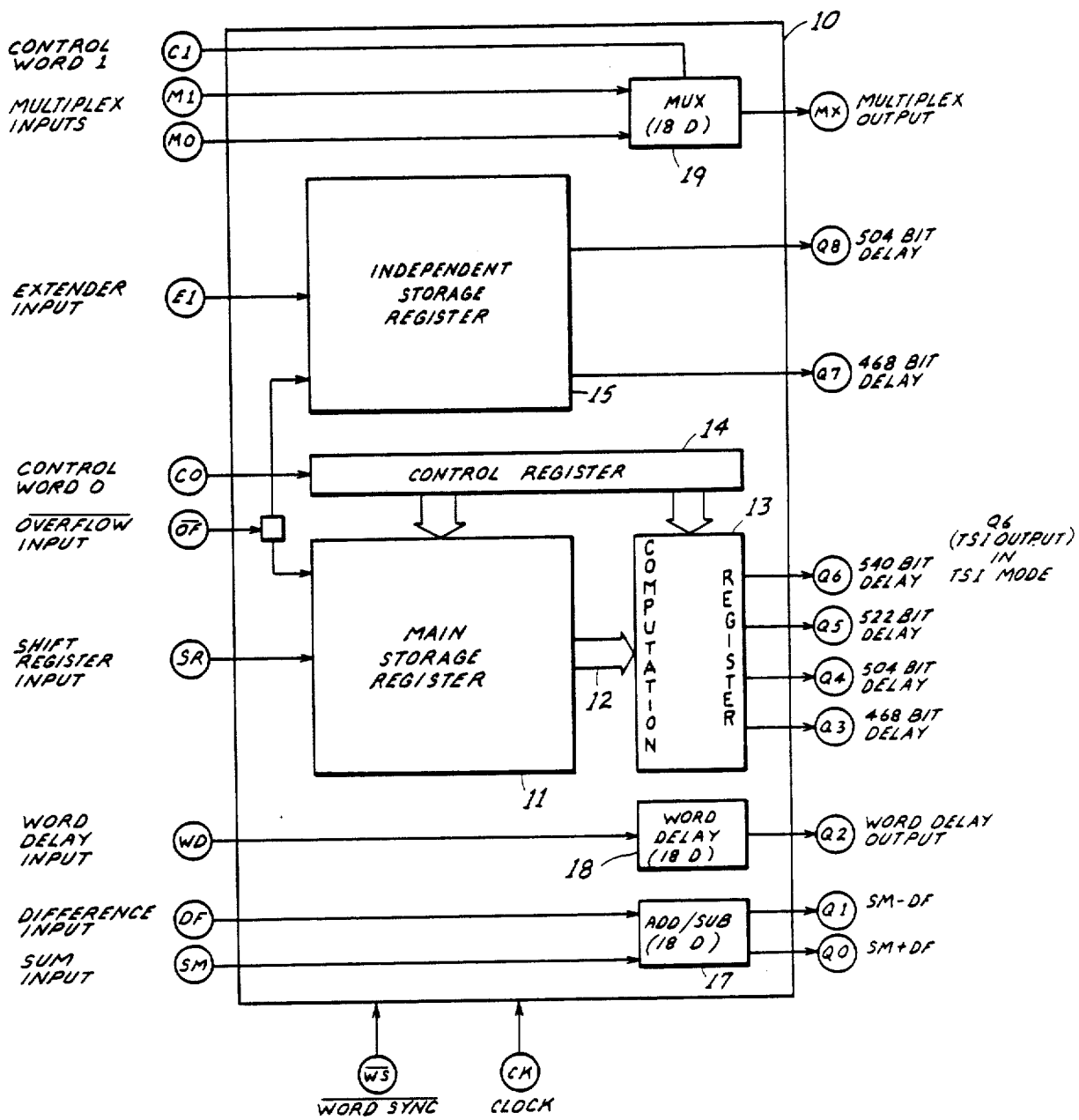
FIG. 1 is a block diagram of a processing register according to this invention employed in a shift register mode.

Referring to FIG. 1 there is shown a block diagram of a processing register (PR) 10 according to this invention. In order to facilitate understanding of the following description, the register 10 is shown with designated inputs and outputs with the particular input or output lead designated by the signal input or output and with the abbreviated designation shown within a circle.

The processing register (PR) 10 as will be understood is provided in integrated circuit form and may employ CMOS or other suitable technology.

In order to best understand the construction and operation of the PR 10 the mode operation capability will be explained with reference to the block diagram of FIG. 1 together with a series of timing diagrams. The PR 10 is capable of operating in five basic modes, which are:

1. A shift register mode with multiple fixed delays (SR MODE).
2. A shift register mode with multiple fixed delays and a time slot interchanger (TSI MODE).
3. A shift register mode with an alternating word pair interchanger (AWPI MODE).
4. A programmable delay shift register with 2 to 1099 bits of delay (PDSR MODE).
5. A 14 point Discrete Fourier Transform processing mode in which two PR modules and a high speed multiplier module are combined to perform a continuous complex 14 point Discrete Fourier Transform (DFT MODE).

As will be explained in each of the above described modes of the PR 10 all data, computations, and controls is synchronized with the clock and word sync (CK & $\overline{WS}$) shown as inputs to the PR 10 at the bottom. In the explanation of the logic operation and timing diagrams all changes of state occur on the rising edge of the clock and the active-low word sync defining the most significant bit (MSB) of each word. All operations are performed on words synchronized with word sync ($\overline{WS}$), and for present purposes 18 is the least number of bits upon which the PR 10 will perform an operation. Thus the various modules depicted can handle 18 bits for storage and computation.

Figure 2:
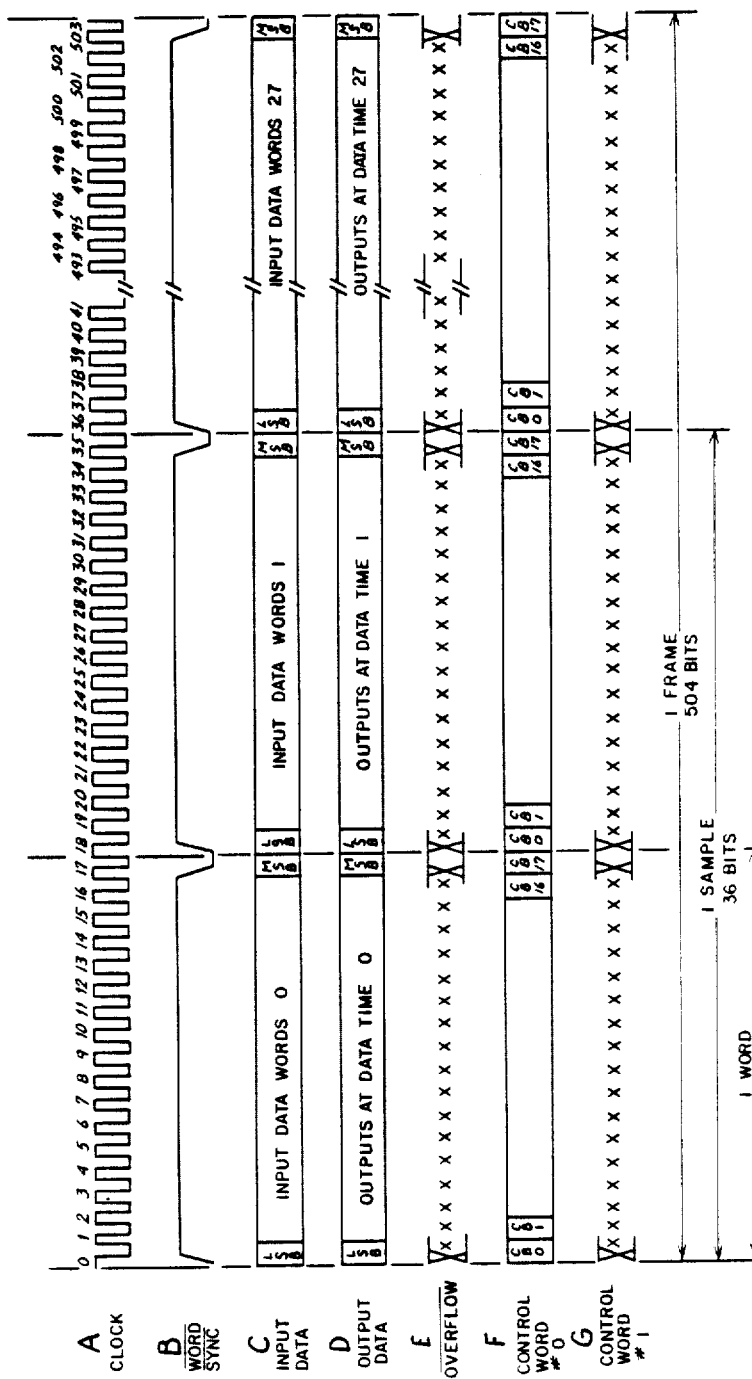
FIG. 2 is a timing diagram depicting waveforms utilized as external input signals to the processing register.

Referring to FIG. 2 there is shown the relationship, between the external signals supplied to the PR 10 such as the clock, word sync, control words (C1 and C0), input and output data, and the overflow input.

FIG. 2A shows the clock input (CK) signal which is a repetitive pulse train generated by an astable multivibrator or digital clock circuit.

There is shown in FIG. 2A a presentation of 504 clock pulses to define a complete data frame, which frame consists of 504 bits.

In FIG. 2B a word sync signal is depicted, the word sync ($\overline{WS}$) signal provides a pulse with a rising edge during the 18, 36, 54 and 50 bit word. Techniques for generating the word sync signal from the clock signal (CK) are well known.

As seen from FIG. 2C each input data word as 0 to 27 consists of 18 bits with a least significant first bit (LSB) and a most significant last bit (MSB) as does each output data word depicted in FIG. 2D. FIG. 2E depicts the overflow signal which indicates an overflow condition by an active-low bit in the MSB of the overflow input word ($\overline{OF}$). This condition causes the corresponding data to be cleared in the main and independent storage register, as will be explained.

In FIG. 2F & G, there are shown the formats for the control words as control word #0 (C0) and control word #1 (C1). Each control word consists of 18 bits from CB0-CB17. As seen from the timing diagrams of FIG. 2 all signals are synchronized with the rising edge of the clock signal (CK) and are recognized as words with the MSB defined by the active-low bit of the word sync ($\overline{WS}$) depicted in FIG. 2B.

Referring back to FIG. 1 there is shown a main storage register 11. The register 11 has a shift register input (SR) and an output bus 12 coupled to a computation register 13. The register 13 can direct delayed outputs from register 11 directly to the output leads Q3 (468 bit delay), Q4 (504 bit delay), Q5 (522 bit delay) and Q6 (540 bit delay) as will be explained during the shift register mode (SR mode) indicated above. The main storage register 11 and the computation register 13 are capable of being controlled and directed by a control register 14. Register 14 has one output bus connected to register 11 and another connected to register 13. The control register 14 receives the input control word 0 (C0) which designates the type of control and hence the operation to be performed by registers 11 and 13.

An independent storage register 15 is also shown in the PR10. Register 15 as register 11 is a shift register having multiple taps. Register 15 receives an input signal designated as extender input (EI) and has the overflow input (OF) which is also applied to the main storage register 11. The outputs of the independent storage register 15 are Q8 (504 bit delay) and Q7 (468 bit delay).

Also included within the PR 10 is a sum and difference register or adder/subtractor 17 having a difference input (DF) and a SUM input (SM) with outputs designated as Q1 for providing the difference SM-DF and output Q0 for providing the SUM SM+DF. Each of the inputs to register 17 as DF & SM are 18 bit words as depicted in FIG. 2C with the output as shown in FIG. 2D.

Located in the PR 10 is a 18 bit word delay register 18 having an input designated as Word Delay Input (WD) and an output designated as Word Delay Output (Q2).

Also located on the PR 10 is a one of two serial multiplexer (MUX) 19 with two multiplex inputs (M1 & M0) and an output designated as MULTIPLEX Output (MX). The multiplexer 19 is controlled to operate according to the control word 1 input (C1) of the format depicted in FIG. 2G. As will be explained, to facilitate operation of the PR 10 in the above modes; certain of the output and input leads are connected together according to the mode selected.

Before proceeding with a detailed explanation of mode operation of the PR 10 a few comments will be made concerning the structure and functions of the registers and modules shown in FIG. 1.

The main storage register 11 consists of 576 bits of delay line. Essentially such registers are well known and can be fabricated by conventional MOS, CMOS or other technology. See for example a text entitled "MOS Integrated Circuits" edited by W. M. Pelid & L. Lau, (1972) by Van Nostrand Reinhold Company. The register 11 has multiple internal taps to enable designated bits as 514, 522, 504 and 468 to be directed as outputs. In the first four modes described above as SR, TSI, AWPI and PDSR the shift register input SR feeds data directly into the storage register 11. Desired outputs are selected by the computation register 13. In the DFT mode all connections to the main storage register 11 are internal through the computation and control registers 13 and 14 and in the mode the SR input is ignored.

The independent storage register 15 is a block of 504 bits of serial delay with one tap at 468 bits of delay. Internal taps provide the proper data in the AWPI mode as will be explained.

The sum and difference register 17 functions during all modes except the DFT mode and is shown as the ADD/SUB 17. This register takes two inputs and produces two outputs as described. Each computation in register 17 is done in two's complement binary arithmetic. Many examples of adder and subtractor registers 17 are known in the art as well as techniques for implementing the same. See for example a text entitled "Arithmetic Operations in Digital Computers" by R. K. Richards (1955) D. Van Nostrand Co., Inc., as well as many other texts and articles on such devices.

The inputs and outputs of the register 17 are shifted serially with the LSB first. There is a one-word (18 bit) delay in the register from input to output. The word sync ($\overline{WS}$) defines the MSB of each input and output words (FIG. 2) and no external indications of overflow are provided.

The computation register 13 is a programmable selecting and computing register under control of the control register 14 which receives program instructions from the input control word 0 (C0). The register 13 is used in all modes of PR operation. In the DFT mode the circuitry of the ADD/SUB register 17 is also used as will be explained. In the DFT mode the data input is the difference input (DF) which data is entered directly into the computation register 13, The shift register (SR), word delay (WD) and sum (SM) inputs are not used and are ignored during this mode.

The computations and the data recirculations necessary for the DFT operation are also accomodated by the computation register 13 in conjunction with the main storage register 11. As will be explained, the sum and difference register 17 is used in implementing these computations as well. The outputs Q0 through Q6 are each employed as DFT outputs when the PR 10 is operating in the DFT mode.

The multiplexer register 19 (MUX) is a two line to one line multiplexer controlled by the MSB of the control word 1 (C1). If the control bit of the control word which is the most significant bit (MSB) is low, the M0 input is selected during the next word. In similar manner if the control bit is high the M1 input is selected during the next word. The multiplexer 19 will provide an 18 bit delay within the register except when operating in the PDSR mode. In this mode there is a programmable delay of 2 to 17 or 19 bits. Examples of multiplexers which are programmable are known in the art and many circuit implementations can be employed to achieve multiplexer operation.

The word delay register 18 is available for operation in all modes as above described except in the DFT mode. The word delay register 18 provides 18 bits of serial delay for each input word. In the DFT mode the word delay input (WD) is ignored.

The control register 14 is a serial in, parallel out shift register with output latches or gates which operate to hold the parallel outputs valid for 18 clock cycles while another control word is shifted into the register. In the control register 14 one control word 0 (C0) is shifted into the control register during each 18 block bits as synchronized by the word sync ($\overline{WS}$). The 18 bits are then shifted in parallel into the output latches which hold and store the bits for use during the next word. The individual bits of the control word 0 (FIG. 2F) are used during each word to control the operation of the main storage register 11, the computation register 13 and the other circuitry necessary to define the mode of operation and to control the functions within each mode as will be explained.

The overflow input ($\overline{OF}$) may be in a low state during the most significant bit of a word and if the word sync ($\overline{WS}$) input is low than input data is zeroed in both the main register 11 and the independent storage register 15. As will be explained in all modes except the AWPI mode the data cleared in the presence of an overflow condition is the one word whose MSB coincides with the overflow. In the AWPI mode, the corresponding word pair is cleared. If an overflow was detected on the first component word than that word and the following word are cleared. An overflow on the second component word clears that word and the preceding word. Thus the above desciiption relates to the implementation of the various modules depicted in FIG. 1. It is understood that such modules can be implemented by conventional digital circuit configurations while the operation of each modules in the various modes as well as the timing of operation will give a clear understanding of the exact nature and structure of the individual units.

THE SHIFT REGISTER MODE (SR MODE)

In general, the type of non-multiplicative logic required for digital signal processing consists mainly of storage or delay elements This is true whether the filter is of the Finite Impulse Response (FIR) or the Infinite Impulse Response (IIR) type. In addition to this, an addition and/or substraction capability is sometimes desirable. To this end, the Processing Register provides the following functions:

1. A main serial shift register with multiple fixed taps.
2. An independent shift register with multiple fixed taps.
3. A sum and difference register.
4. A one of two serial multiplexer.
5. A word delay register.

A block diagram of the processing register in this mode is shown in FIG. 1.

The position of the multiple fixed taps of the shift registers and the delays through the word delay, multiplexer, and the sum and difference register may be chosen to fulfill a host of systems requirements.

An example of a typical filter arrangement could be for a Biquadratic filter. The filter transfer characteristic may be expressed as:

$$H(Z) = \frac{(A_1 + jB_1) + A_2Z^{-1} + (A_1 - jB_1)Z^{-2}}{1 - (A_4 + jB_4)Z^{-1} - (A_5 + jB_5)Z^{-2}}$$

In this mode the shift registers 11 and 15 constitute the major functions of the SR mode. The main register 11 operates with the SR input and outputs at Q3 (468 bit delay), Q4 (504 bit delay), Q5 (540 bit delay). The independent storage register 15 has the extender input (EI) with a 408 bit delay at Q7 and 504 bit delay at Q8. These two registers 11 and 15 operate independently except for sharing common overflow logic.

Figure 3A:
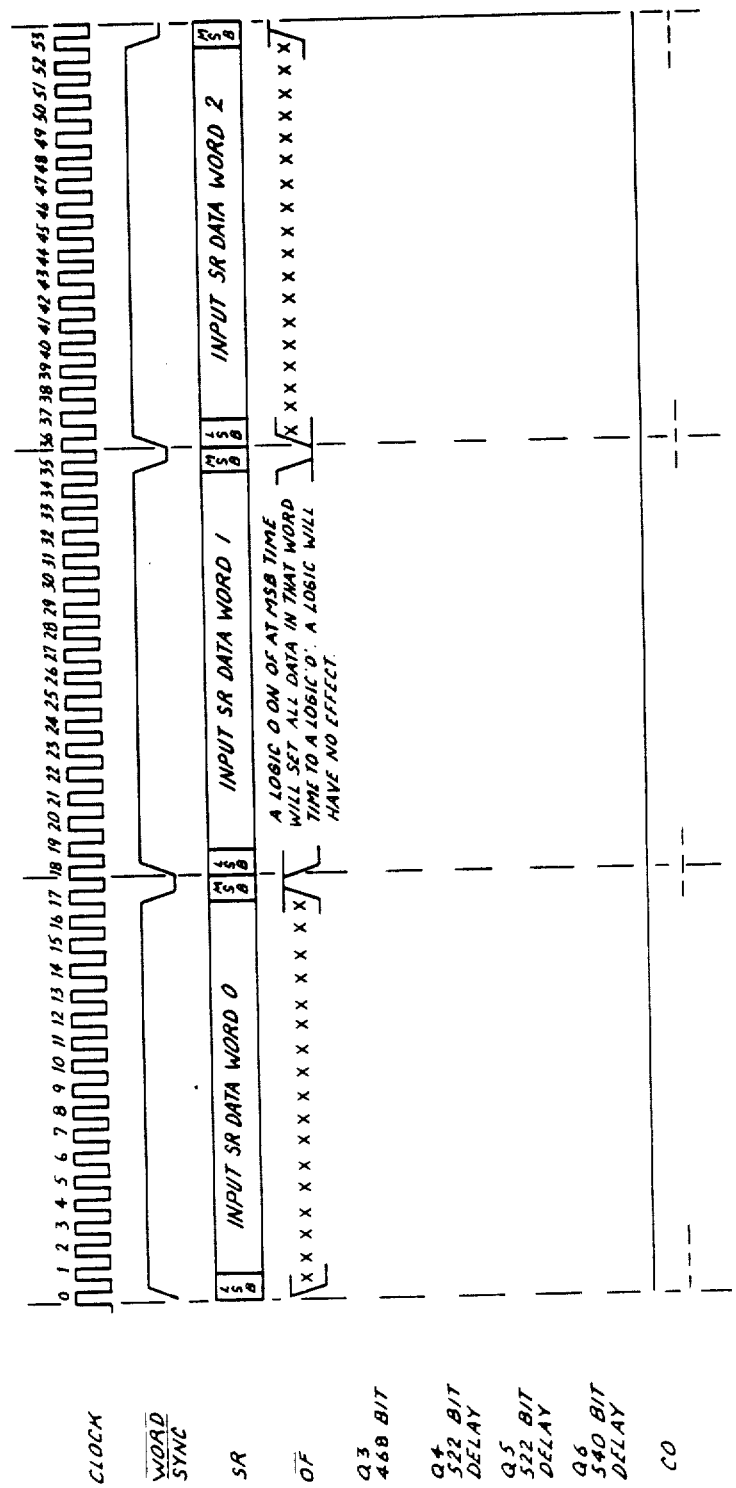

Referring to FIG. 3A there is shown a timing diagram depicting operation of the main shift register 11. Shown in FIG. 3A is 54 clock cycles which represent three input data words. The word sync or $\overline{WS}$ input is shown beneath the clock waveform. The SR input to the shift register 11 consists of three words each of 18 bits and designated as 0-2. The overflow input $\overline{OF}$ is shown beneath the SR signal. If a logic 1 condition exists in the $\overline{OF}$ signal during the most significant bit MSB of a data word, there is no effect on the word as stored in the shift register. In any event, if there is a logic 0 on the $\overline{OF}$ at the MSB time, data in that word is set to a all 0 condition. This is shown in FIG. 3A for the input SR data word 1 during the 35th clock period where the $\overline{OF}$ signal is at a logic 0. Therefore during this time the input SR data word 1 will be set to a all 0 condition as shown in FIG. 3A.

Figure 3B:
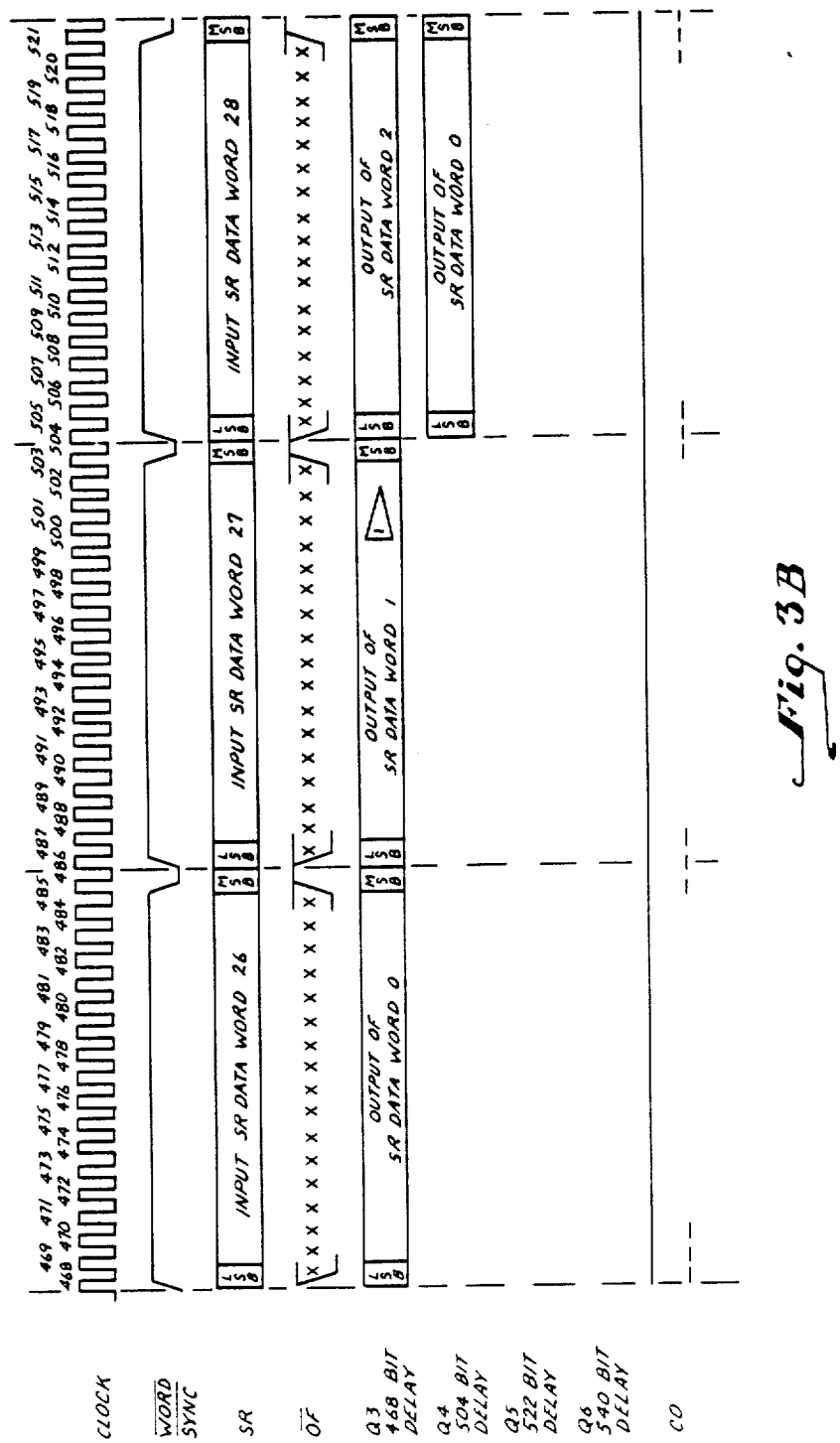

Referring to FIG. 3B there is shown the clock waveform which occurs from the 468 clock pulse to the 521 clock pulse. The word sync signal is as shown in FIG. 3A and occurs for every 18 clock pulses. Also shown is the SR input to the main shift register 11. The data during the clock period shown in FIG. 3B corresponds to input SR data words 26 to 28. The overflow signal $\overline{OF}$ shows no overflow condition since the pulse as present at the MSB of each data word is at logic 1.

The output during the SR mode at Q3 corresponds to data word 0 occuring with an 468 bit delay, data word 1 with the same delay and data word 2. The output at the Q4 output, which is a 504 bit delay, shows data word 0 now appearing between clock pulses 504 to 521. Shown in FIG. 3B and associated with SR data word 1 is a triangle with the No. 1 inside. This indicates that the data in word 1 was set to a logic 0 condition by the overflow pulse which occurred in clock period 35 as shown in FIG. 3A.

Referring to FIG. 3C there is shown the clock waveform depicting clock pulses 522 to 575. The words sync signal ($\overline{WS}$) is at all zeroes during the MSB of each input data word which now are words 29 to 31. The $\overline{OF}$ signal is at all ones during the MSB indicating no overflow. The outputs Q3, Q4, Q5 and Q6 as shown in FIG. 1 are indicated in FIG. 3C showing how the input SR words are inputed from the main storage register 11 each having the requisite delay of 468, 504 and 522.

Referring now to FIG. 4A there is shown timing diagrams depicting operation of the independent storage register 15 and the word delay associated with that register's operation. Again in FIG. 4, the clock is shown as clock pulses 0-53 corresponding to the sequence shown in FIG. 3A. The word sync signal is of course the same. The input signal which is the extender input (EI) is shown as the input to the storage register 15 and again consists of input data words 0-2. The $\overline{OF}$ signal again corresponds to the $\overline{OF}$ signal shown in FIG. 3A and upon receipt of a logic 0 during the 35th clock pulse the input EI data word 1 will also be changed to all zeroes. Also shown in FIG. 4A is the WD input or the word delay input as applied to the word delay generator 18. Again each input word is designated as WD data word 0 to WD data word 2 in FIG. 4A. The output of the word delay generator 18 at Q2 delays each input WD data word by 18 bits as shown in FIG. 4A.

Figure 4B:
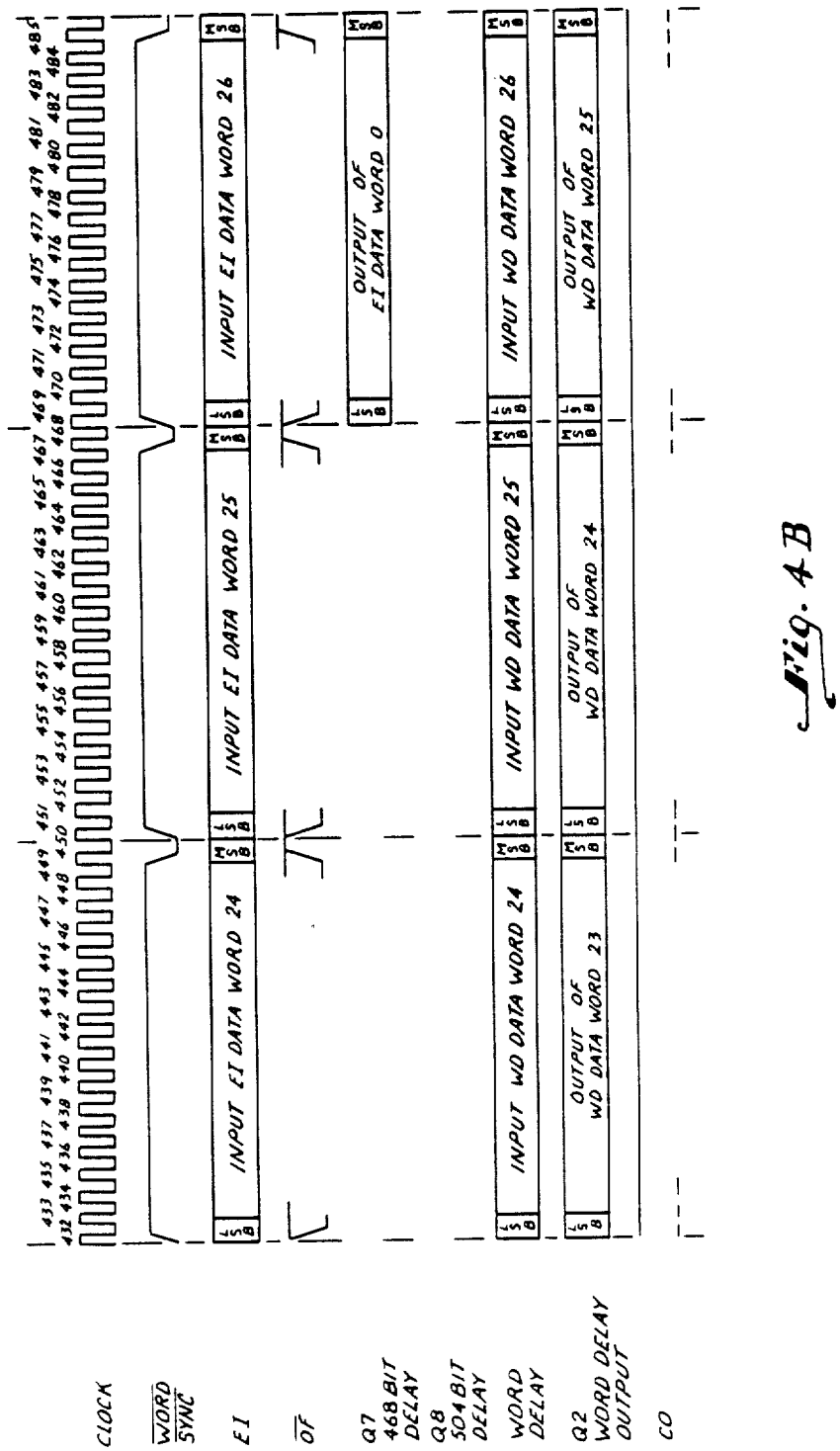

Referring to FIG. 4B there is shown the timing diagram of the independent storage register 15 and the word delay generator 18 during clock pulses 432 to 485. As one can see during this period the EI data word 0 is outputed at Q7 which corresponds to a 468 bit delay. The output Q2 of the word delay register 18 is also shown wherein each word is delayed by 18 bits.

Figure 4C:
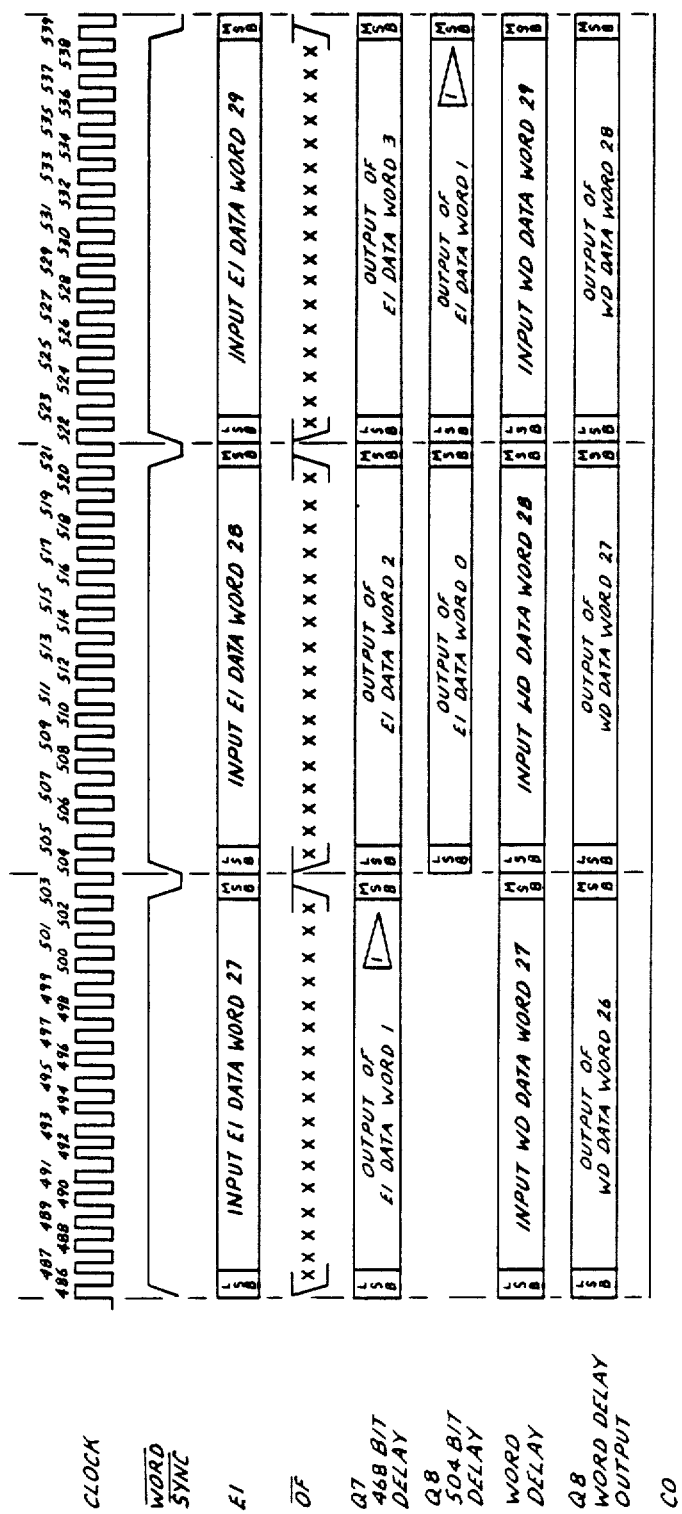

Referring to FIG. 4C there is shown the outputs of the storage register 15 and the word delay register 18 during the clock pulses 486 to 539. Hence as seen in FIG. 4C the storage register 15 now outputs EI data word 0 and EI data word 1 at Q8 which is a 504 bit delay. The output of Q7 at this time are EI data words 1, 2 and 3 as shown in FIG. 4C. Thus in conjunction with the timing diagrams depicted in FIGS. 3 and 4, one can immediately ascertain the operation of the main storage register 11 and the independent storage register 15. From the timing diagrams, one will immediately understand how the registers are constructed in regard to the utilization of the clock, word sync and overflow signals to cause operation as depicted in the timing diagrams. Thus as shown in FIGS. 3 and 4 when an overflow condition is indicated by a logic 0 in the MSB of $\overline{OF}$ the corresponding data words as SR and EI are zeroed in both the main shift register 11 and the independent shift register 15. This delay aspect is extremely useful in digital processing and as one can see affords delay of an entire frame of data as a 504 bit delay as well as word multiples of a frame such as a 468 bit delay which is the frame less 2 words, a 522 bit delay which is the frame +1 word and a 540 bit delay which is the frame +2 words.

Another function available in the SR mode is the sum and difference register 17 operation. In the sum and difference register 17 inputs sum (SM) and difference (DF) are combined using two's complement arithmetic to give a sum output Q0 (SM+DF) and a difference output Q1 which is (SM−DF). The data is added or subtracted serially in 18 bit words. Any overflow generated in either operation is cleared without external indication. The input and output data is synchronized by word sync ($\overline{WS}$) and there is a 18 bit delay from the inputs to the outputs.

In this mode the multiplexer 19 (MUX) may also receive the multiplexer inputs M1 and M0 and the multiplexer can perform the fourth function of PR 10 in the SR mode. The output MX is controlled by the MSB of control word 1 (C1) which control bit selects the inputs from either M0 or M1. For example, if the control bit is low, M0 is selected during the next word. If the control bit is high M1 is selected. In the multiplexer there is a delay register which provides an 18 bit delay from the inputs M1 and M0 to the output MX.

Referring to FIG. 5 there is shown timing diagrams depicting operation of the sum and difference register 17 and of the multiplexer 19. Again the clock signal is shown from bits 0 to 53 followed by the word sync signal (FIG. 5A). The SM signal is the input signal to the adder/subtractor or the sum and difference register 17 and again consists of 18 bit data words designated as SM data word 0 to SM data word 2. The DF signal is the input to register 17 and consists of 18 bit data words designated as DF data word 0 to DF data word 2. The output signal at output Q0 is shown. Essentially, the first output occurs at the 18 clock pulse and consists of the sum of SM data word 0 and DF data word 0. The output Q1 oonsists of the difference of SM data word 0 and DF data word 0 also delayed by 18 bits. The sum and differences are provided by register 17 at outputs Q0 and Q1 for each successive word. It is noted that the input C0 to control register 14 is at a logic 1 which condition causes the processor to operate in the SR mode. This operation is shown in FIGS. 3 and 4 as well wherein the C0 input to control register 14 is held at logic 1 during SR mode operation. Also shown in FIG. 5 is the input M0 to the multiplexer 19 and the input M1 to multiplexer 19. Each input data word has a M0 and M1 data word also consisting of 18 bits.

Shown in FIG. 5A is the control word input (C1) to the multiplexer 19. A logic 0 on C1 at the MSB time of an input data word multiplexes the data word at the M0 input during the next word time to the output MX as shown in FIG. 5A. A logic 1 during the MSB time multiplexes the data word at the M1 input during the next word time to the output multiplex. Thus as shown in FIG. 5, there is a logic 1 occuring during the eighteenth clock pulse. This logic 1 causes M0 data word 0 to be provided at the output of the multiplexer 19 with an 18 bit delay. Thus as shown in FIG. 5A the M0 data word 1 appears at the output of the multiplexer (MX) during clock pulses 36 to 53. Thus, as can be seen during the SR mode of the PR 10, operation occurs as indicated in FIGS. 3 to 5 and is determined by the control word 0 being at logic 1.

The above described SR mode is a relatively conventional mode but has been described in detail in conjunction with the block diagram of FIG. 1 to gain an understanding of operation. It can thus be seen that the control word 0 as applied to the control register 14 and as shown in the timing diagram of FIG. 2 can program the control register 14 which in turn will control the various modules as registers 11, 13 and so on according to the operating requirements of the particular mode the PR 10 is operating in. In a similar manner the control word 1 (C1) as applied to the multiplexer 19 also serves to program the PR 10 as will be described subsequently.

Referring to FIG. 6 there is shown a complex Biquadratic filter section. The filter configuration as shown in FIG. 6 is well-known and can be implemented by the above described processing register for an input signal where both the data and coefficientsare complex. As can be seen in regard to FIG. 6 the delays as 80 and 81 may be supplied by the appropriate taps on the main storage register while the difference function indicated by module 82 is supplied by the adder and subtractor 17 of FIG. 1.

In a similar manner, the independent storage register 15 can provide the delays depicted by modules 83 and 84 or may be furnished by an independent processing register module as shown in FIG. 1. The multipliers depicted as 90 and 91 are summing multipliers, many examples of which are known in the art. It is thus seen from FIG. 6 that a complex Biquadratic digital filter can easily be implemented by combinations of the above described processing register operating in the shift register or SR mode.

Referring to FIG. 7, there is shown four processing registers 70 to 73 arranged with two multipliers 74 and 75 to provide a biquadratic filter section. As seen from FIG. 7, the processing registers 70 and 71 have the SM and SR inputs connected together. In this manner the main storage register receives SR data which is also directed to the SM input of the adder/subtractor register 17.

As can also be seen, the Q8 and DF inputs are also tied together as are the Q4 and EI inputs. Thus the input signal to the independent storage register 15 is the Q4 signal from the main storage register 11. This signal is delayed at Q8 by 504 bits and is the input to the adder/subtractor register 17 at DF. The input Q5 is applied to the X0 input of the multiplier 75 from PR71 and output Q5 is also applied to the XO output of multiplier 74 from PR 70. In a similar manner, the Q0 outputs are applied to the X1 input of the associated multiplier while the Q1 output of PR 71 is applied to the S2 output of multiplier 74 with the Q1 output of PR70 applied to the X2 input of multiplier 75.

High speed multipliers such as 74 and 75 are known in the art and operate to multiply input signals at inputs according to a program sequence. The output processing registers receive the product PS signals from the multipliers including the overflow signal OF which is applied via a gate 76 to the overflow input of the output processing registers 72 and 73.

In the output registers Q4 is connected to EI and SM is connected to SR with the outputs taken at Q0. The implementation of a biquadratic filter section using the processors is extremely simple and many biquadratic implementations can be afforded using the processing register 10. The control word at the C0 input is coupled to control modules 78 and 79 which provide the proper input control words to register 14 for Biquadratic operation.

THE SHIFT REGISTER MODE WITH TIME SLOT INTERCHANGER (TSI MODE)

In the DSP domain, there often arises the need for reordering a stream of samples. This may come about due to the need to change channel assignments, to reorder data to facilitate or simplify the next state of processing (such as in some implementations of a Discrete Fourier Transform), or for various other reasons. The need, therefore, is to be able to take a group of samples and continuously input, store reorder and output them. This reordering must be controlled, therefore, the reordering should be a programmable function capable of being changed at a rate of once per sample. This provides the non-restrictive access to the data that is necessary for a completely random reordering of a sample stream.

Once again the control of the ordering may be executed by any suitable medium, whether by ROM or RAM or some other type of appropriate controller.

The Processing Register in this application, operates in much the same way as in the shift register mode. This allows the parts of the Processing Register not used specifically for the TSI function to be shared with some other activity. The exception is one output that in the SR mode was a fixed tap. In the TSI mode, this tap, under programmable control, is attached to one of a number of internal points along the main shift register.

The time slot interchanger (TSI mode) mode provides a selectable serial delay from the shift register input SR to the output Q6. In this mode any delay can be chosen between 18 and 522 bits in incrementsof 36 bits. Accordingly the unit can provide a selectable delay output delayed by a factor of 18, 54, 90, 126 and so on. In this mode the control bits CB4 to CB12 in control word (C0) 0 select internal gates which are in the computation register 13 to connect the output Q6 to any one of the fifteen points in the main shift register to thereby access a 18 to 522 delay. A 540 bit delay is also available at Q6 when bits CB4 to CB12 are set to a logic 1 as in the SR mode. This feature is extremely useful and one can delay data entering the SR input by the above indicated delays and continuously or periodically change the delay by changing the control word 0 as applied to the control register.

In the TSI mode the independent storage register 15, the word delay register 18, the adder/subtractor register 17 and the multiplexer 19 function exactly as described above in the SR mode. In this mode the main storage register taps at Q3 (468 bit delay), Q4 (504 bit delay) and Q5 (522 bit delay) are still available as in the SR mode. The configuration of the PR in the TSI mode is the same as in the SR mode and as shown in FIG. 1.

The following table gives the control word inputs for the C0 necessary for selection at the Q6 output of shift register 11 of each possible output delay point. In the table control bits in C0 other than CB4 to C12 are set to a logic 1. X in the table indicates a "DON'T" care value while all other bits in control word 0 are set to logic 1:

TABLE 1

| DELAY FROM SR TO Q6 | TSI CONTROL WORDS CONTROL WORD 0, BITS C4-C12 | | | | | | | |
|---|---|---|---|---|---|---|---|---|
| | C4 | C5 | C6 | C7 | C8 | C9 | C10 | C11 | C12 |
| 18 | 0 | 1 | 1 | X | X | X | X | X | X |
| 54 | 0 | 1 | 0 | X | X | X | X | 1 | 1 |
| 90 | 0 | 1 | 0 | X | X | X | X | 0 | 1 |
| 126 | 0 | 1 | 0 | X | X | X | X | 1 | 0 |
| 162 | 0 | 1 | 0 | X | X | X | X | 0 | 0 |
| 198 | 1 | 0 | 0 | X | X | 1 | 1 | X | X |
| 234 | 1 | 0 | 0 | X | X | 0 | 1 | X | X |
| 270 | 1 | 0 | 0 | X | X | 1 | 0 | X | X |
| 306 | 1 | 0 | 0 | X | X | 0 | 0 | X | X |
| 342 | 0 | 0 | 0 | 1 | 1 | X | X | X | X |
| 378 | 0 | 0 | 0 | 0 | 1 | X | X | X | X |
| 414 | 0 | 0 | 0 | 1 | 0 | X | X | X | X |
| 450 | 0 | 0 | 0 | 0 | 0 | X | X | X | X |
| 486 | 1 | 0 | 1 | X | X | X | X | X | X |
| 522 | 0 | 0 | 1 | X | X | X | X | X | X |
| 540 | 1 | 1 | 1 | X | X | X | X | X | X |

From the above indicated table one can understand the operation and selection of a delay as well as the necessary circuitry for implementing the delay. For example, the control register 14 may comprise a series of cascaded flip flops or multi-vibrators arranged as a shift register. Such circuitry arrangements are well-known in the art and many examples of registers exist as indicated in the above referenced text. The control register 14 is associated with a series of decoding gates to decode the bit values of the control word. Each gate is therefore able to decode the delay request according to bits C4 to C12 as shown in table 1. This therefore determines which stage or tap of the main storage is to be accessed and that tap is applied to output Q6 during the TSI mode.

An overflow indication in the TSI mode is implemented exactly the same as in the SR mode which as explained zeroes the corresponding data words in the main and independent registers 11 and 15. The operation is shown in FIGS. 3 and 4 and occurs whenever $\overline{OF}$ is a logic 0 during the MSB of an input data word.

SHIFT REGISTER WITH ALTERNATING WORD PAIR INTERCHANGER (AWPI MODE)

In the construction of complex digital filters (where complex is defined as samples and/or coefficients consisting of a real part and an imaginary part, thus returning two words to represent one sample), it is often desirable to handle data as word pairs. The computation of a complex filter requires that these word pairs be used at one multiplier data input pair, then switched and one sample complimented and again applied to the same input pair. This allows the correct computation of alternately the real and then the imaginary part of the data sample (though not necessarily in that order).

A Processing Register programmed to execute in this mode provides the same storage and summation capabilities as in the shift register mode with the exception that the one of two multiplex is not available. The difference is that the outputs that must provide the switched and complimented data are changed from their fixed tap position and programmably directed to output the proper word of the sample pair with its correct sign. The Processing Register also has facilities to handle overflowed data on a word pair basis, setting both components of the word pair to zero if an overflow occurs, regardless of which component caused it. A block diagram of the Processing Register in this mode is shown in FIG. 8.

An example of a typical filter arrangement using the Processing Register in this mode could be Biquadratic filter. The filter transfer characteristic may be expressed as:

$$H(Z) = \frac{(A_1 + jB_1) + A_2 Z^{-1} + (A_1 - jB_1)Z^{-2}}{1 - (A_4 + jB_4)Z^{-1} - (A_5 + jB_5)Z^{-2}}$$

As one can ascertain from the above during the SR and TSI modes the configuration of the processing register is the same with the exception that the outputs of the registers vary according to the mode.

Referring to FIG. 8 there is shown a block diagram of the PR10 when operating in the AWPI mode. It is understood that the structure of the PR 10 is the same as shown in FIG. 1 but additional connections are shown which were not depicted in FIG. 1 for the sake of clarity. It will be noted that in FIG. 8 the input and output signals are the same as well as each module and therefore identical reference numerals have been retained to designate the equivalent modules.

In the AWPI mode the PR chip accepts a serial stream of data word pairs. For example, a word pair may consists of a real word followed by an imaginery word to form a complex sample. The formation of a complex sample or a complex number is extremely useful in digital processing systems. Essentially, by allowing the PR to perform functions on a real word and an imaginery word, one can then employ the processing register as PR 10 and a multiplier to implement complex digital filter arrangements. In this mode the main shift register 11 operates and functions essentially in the same manner as above described for the SR and TSI modes. In this arrangement the input SR feeds serial data into the main shift register 11 with output Q6 allowing selectable delays based on the control bits indicated in Table 1 and according to the above description of the TSI mode.

In this mode taps Q3 and Q4 as selected by the computation register 13 yield 468 and 504 bits of delay as in the SR and TSI modes. The independent storage register 15 with its input EI has both taps Q7 and Q8 functioning as above described.

As can be seen from FIG. 8 there is still an 18 word bit delay from WD to Q2 via the word delay register 18. In this mode Q0 which is the output from register 17 is still available and provides the same output from inputs SM and DF delayed by 18 bits as above described.

However, in this mode the multiplexer 19 is disconnected from the control word 1 input and inputs M0, MI. This is accomplished by gates located in the control register 14 which are activated as will be explained during the AWPI mode and operate to disable the above inputs. In this mode the multiplexer provides an output at MX which is the difference output SM−DF and is available in two different forms which are based on the state of the control bit CB13 of control word 0. CB13 in a low condition selects the complement of SM−DF delayed by 18 bits from inputs SF and DF. CB13 in a high state selects the difference SM−DF delayed by 54 bits. Thus as shown in FIG. 6 the output SM−DM from register 17 is now directed to a complement circuit 20 and to a 36 bit delay register 21. Both circuits are known in the art and are incorporated in the multiplexer 19 or at the output of the register 17. In this manner when the AWPI mode is selected suitable gates implement the connection shown in FIG. 8. The output of Q5 is also selected based on the condition of control bit CB13.

CB13 when indicating a logic 0 provides a 450 bit delay from input SR of the main register 11 to output Q5. If CB13 is at a logic 1, the complement of SR is selected and applied to Q5 after 468 bits of delay. In a similar manner Q1 provides the same taps from the independent register 15 as selected by CB13. This is shown in FIG. 6 in the AWP mode the independent register 15 is coupled to the computation register 13. If CB13 is low this results in a 450 bit delay from EI to Q5. If CB13 is high then Q5 provides 468 bit delay complement.

When an overflow condition is indicated by a logic 0 in the MSB of input $\overline{OF}$, the corresponding word pair is cleared in the main and independent storage registers 11 and 15. If an overflow is detected on the first component of the word pair (CB13=0) then that word and the following word are cleared. An overflow of the second component word (CB13=1) clears the indicated word and the preceding word. In order to program the PR chip 10 for the AWP mode, control bit CB0 is set to logic 0 and control bits CB14 and CB17 are set to logic 1. This is accomplished by control word 0. CB13 then selects the functions as described above. For delays at Q6, CB4 to CB12 can be set as described above in the TSI mode while all other bits are set to logic 1.

Figure 9A:
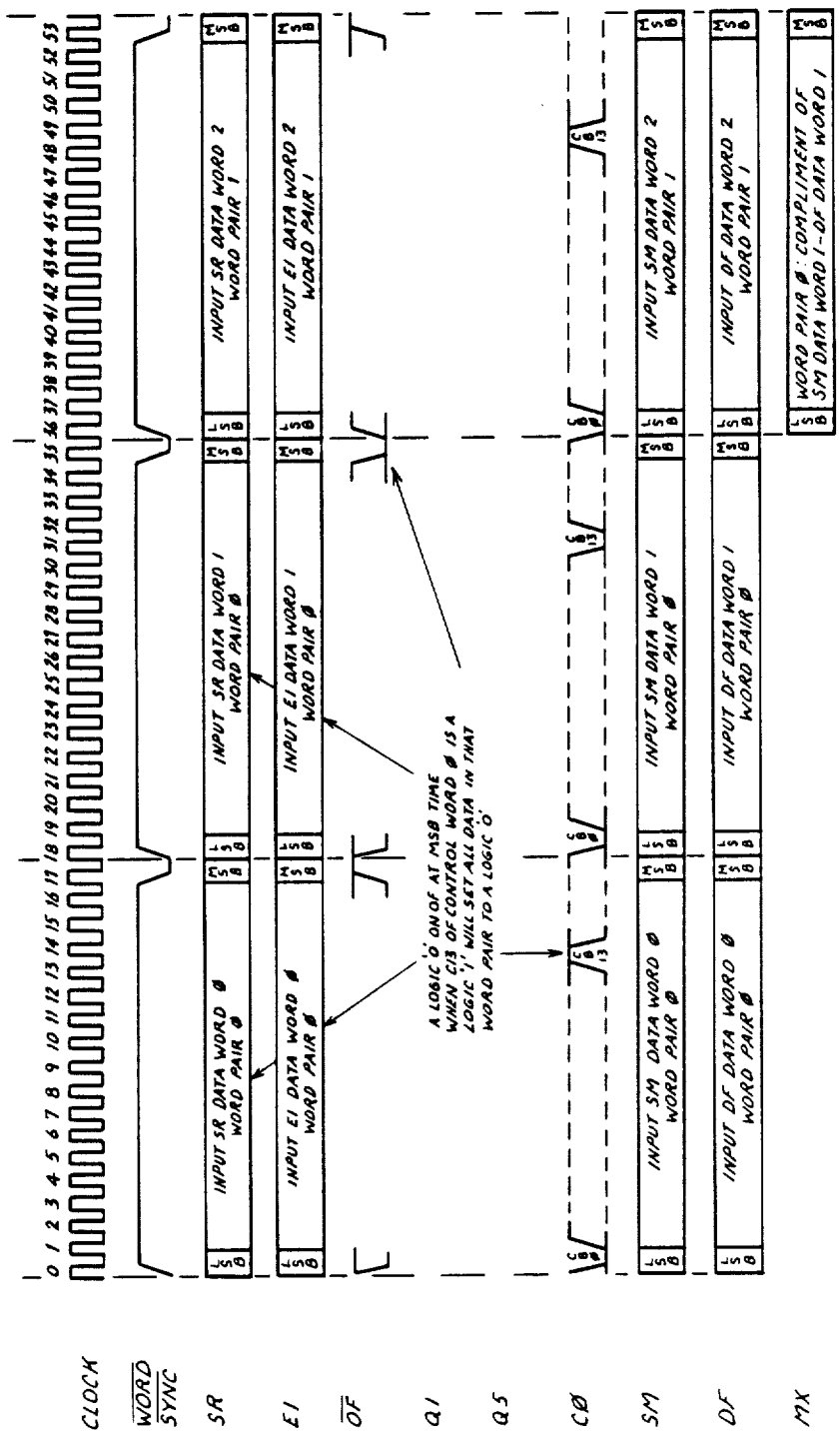
Figure 9B:
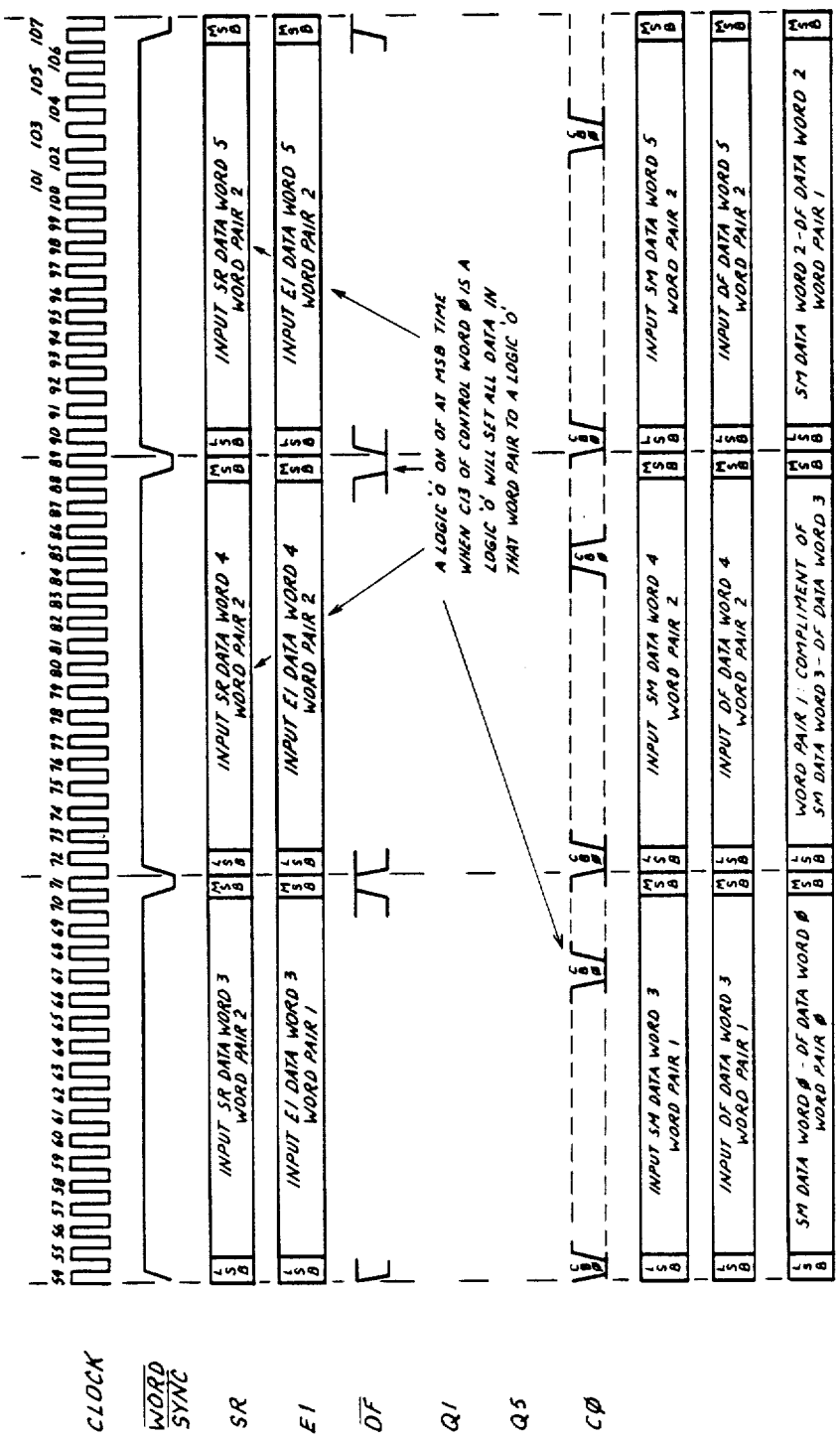
Figure 9C:
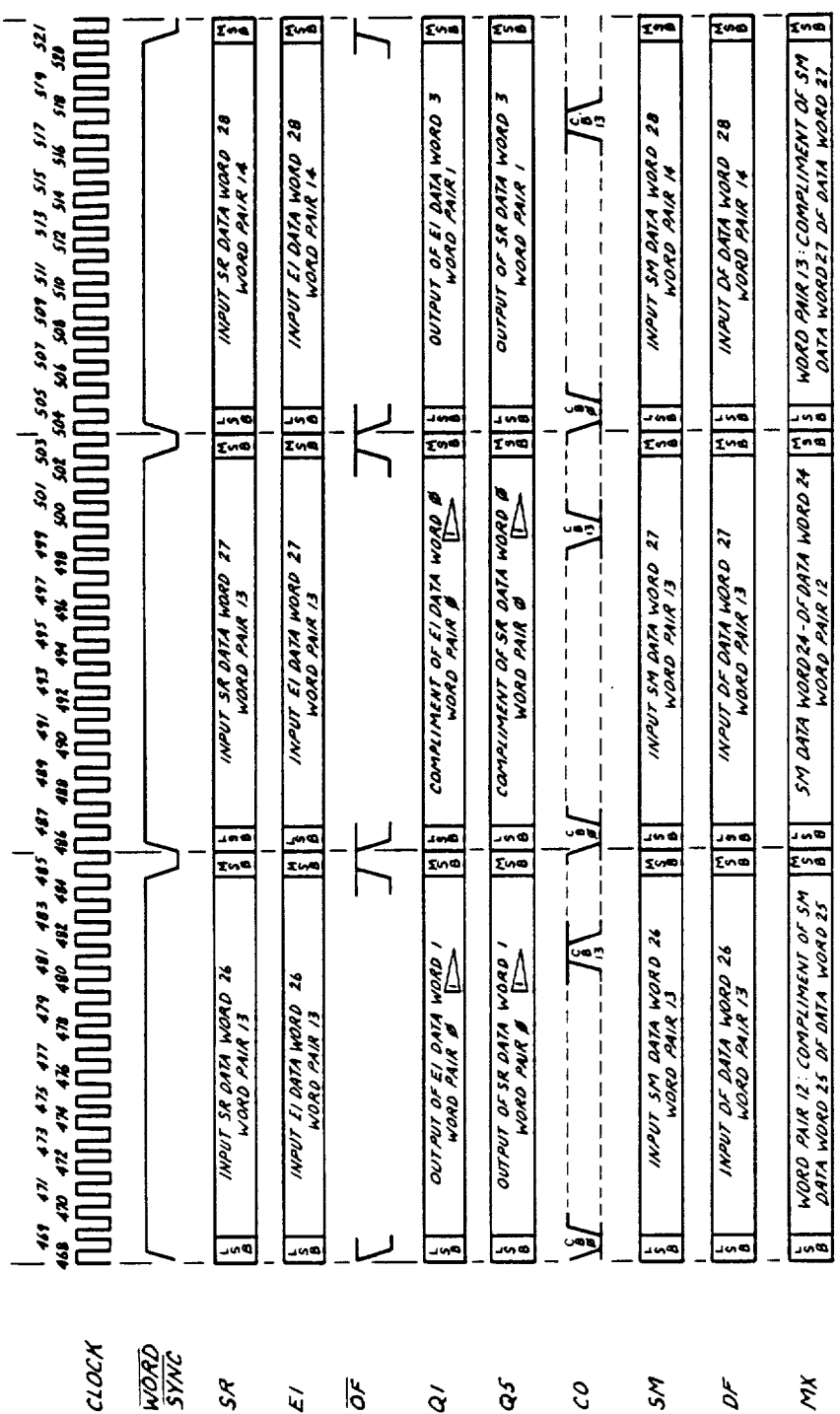
Figure 9D:
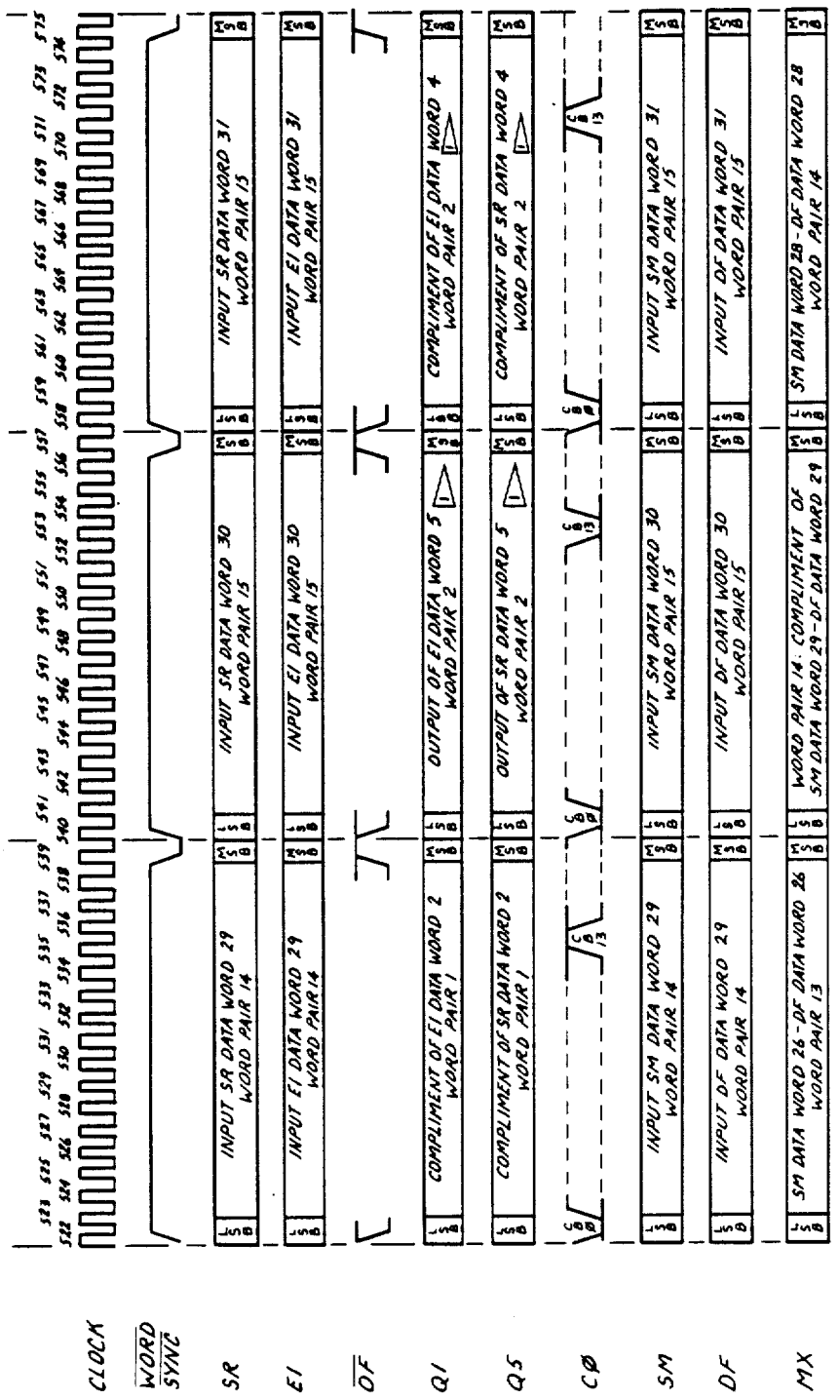

Referring to FIG. 9A to 9D there is shown the timing diagrams for AWPI operation. In FIG. 9A clock bits 0 to 53 are depicted. FIG. 9A shows control word input indicating the operation of CB13 as modifying the EI and SR inputs as described above. FIG. 9B shows the clock operation from bits 54 to 107 again showing the operation of the control bits as explained above. FIG. 9C shows bits 468 to 521 depicting the circuit operation as described above. FIG. 9D shows clock bits 522 to 575 again depicting the entire operation in the AWPI mode. It is again indicated that based on the timing diagrams of 9A to 9D the entire operation of the structure in FIG. 8 is readily understood since the operation is dependent upon conventional digital circuitry operating in complete synchronism as controlled by the clock and word sync signals depicted and shown throughout the timing diagram format.

Referring to FIG. 10 there is shown a complex Biquadratic filter using the AWPI mode as described above. Numeral 100 and 101 referred to the PR 10 operating in this mode and having the structure shown in FIG. 8. As can be seen the filter employs a conventional multiplier 102 and a control circuit 103 which operates to provide the processing registers 100 and 101 with the proper control words at the C0 input.

In the circuit shown in FIG. 10 one may employ an 18 bit word for each data word. This makes the sample 36 bits because each sample consists of two data words. The configuration depicted in FIG. 10 is extremely simple to implement with the above described processing register.

PROGRAMMABLE DELAY SHIFT REGISTER MODE (PDSR MODE).

As previously discussed, most digital signal processing elements are made up of multiplicative, storage and summation elements. Since sample accuracy (the number of bits used to represent a sample) and the number of channels time sharing the same digital filter are likely to vary from application to application, the requirements for the size of the storage elements will be dependent on the system that it is used in. Therefore, to satisfy the most general case of the filter storage requirements, it is desirable to be able to change the delay from the input to the output of the storage element device and preferably to be capable of changing it under programmable control.

The Processing Register in this mode operates in the same fashion as the Alternating Word Pair Mode with the exception that the delay of the one of two multiplex can be programmably varied from 2 bits of delay to M+1 bits of delay (where M is the wordlength).

The Processing Register has the capability to combine its programmable one of N word TSI register (where N is the number of TSI accessible taps on the main shift register) with a programmable one of M bit variable delay multiplexor (where M is the number of bits in a word) to form a long programmable, variable length storage register. These variable delays also can be combined with the fixed delays of the independent storage register, the word delay register and the adder/-subtractor to extend the length of the absolute delay.

The PDSR mode allows the PR chip 10 to function as a block of serial delay giving a delay of 2 to 1099 bits.

Referring to FIG. 11, there is shown a block diagram implementation for this mode. Again all reference numerals have been retained to designate the corresponding registers. In the PDSR mode the main and independent storage registers 11 and 15, the word delay from WD to Q2 and the sum output of Q0 perform as in the AWPI mode as described above.

Output Q6 can be selected to yield delays of 540 bits or 18 to 522 bits in 36 bit increments. Thus in FIG. 8 with input DF set to 0, 18 bits of delay is available from SM to Q0. The combination of the 18 bit delays and the main and independent storage registers which are connected serially can yield any delay from 18 to 1080 bits in 18 bit increments.

The 1 to 2 multiplexer 19 functions in the PDSR mode but has a selectable internal delay rather than the fixed 18 bit delay described in the other modes. In control word 0 (CB1, CB2, CB3, CB13, CB15 and CB16) control the selection of 2 to 19 bits of delay between the multiplexer inputs M0 or M1 and the output MX. The control word C1 controls the selection or inputs of M0 or M1 as described above. For a delay line C1 is set to a logic 0 and M0 is used as the input to the register 19.

Referring to Table 2, there is shown programmable delay control words which are necessary for each delay. In the PDSR mode CB0=0, C14=0 and C17=1. The other bits specify delays in MX and in Q6. The bits C4 to C12 are the TSI control word to give a delay at Q6 and as specified in table 1 all according to control word 0 (C0).

Referring to FIG. 13, there is shown a Finite Impulse Response filter (FIR). In such a filter the transfer func-

TABLE 2

PROGRAMMABLE DELAY CONTROL WORDS

| BITS DELAY FROM M0, M1 to MX | CB0 | CB1 | C2 | C3 | C4-C12 | C13 | C14 | C15 | C16 | C17 |
|---|---|---|---|---|---|---|---|---|---|---|
| 2 | 0 | 0 | 0 | 0 | C4-C12 | 0 | 0 | 0 | 0 | 1 |
| 3 | 0 | 1 | 0 | 0 | TSI CONTROL | 0 | 0 | 0 | 0 | 1 |
| 4 | 0 | 0 | 1 | 0 | WORD FOR | 0 | 0 | 0 | 0 | 1 |
| 5 | 0 | 1 | 1 | 0 | DELAY AT | 0 | 0 | 0 | 0 | 1 |
| 6 | 0 | 0 | 0 | 1 | Q6 (See | 0 | 0 | 0 | 0 | 1 |
| 7 | 0 | 1 | 0 | 1 | Table 1.) | 0 | 0 | 0 | 0 | 1 |
| 8 | 0 | 0 | 1 | 1 | | 0 | 0 | 0 | 0 | 1 |
| 9 | 0 | 1 | 1 | 1 | | 0 | 0 | 0 | 0 | 1 |
| 10 | 0 | 0 | 0 | 0 | | 0 | 0 | 1 | 0 | 1 |
| 11 | 0 | 1 | 0 | 0 | | 0 | 0 | 1 | 0 | 1 |
| 12 | 0 | 0 | 1 | 0 | | 0 | 0 | 1 | 0 | 1 |
| 13 | 0 | 1 | 1 | 0 | | 0 | 0 | 1 | 0 | 1 |
| 14 | 0 | 0 | 0 | 1 | | 0 | 0 | 1 | 0 | 1 |
| 15 | 0 | 1 | 0 | 1 | | 0 | 0 | 1 | 0 | 1 |
| 16 | 0 | 0 | 1 | 1 | | 0 | 0 | 1 | 0 | 1 |
| 17 | 0 | 1 | 1 | 1 | | 0 | 0 | 1 | 0 | 1 |
| 18 | 0 | X | X | X | | 1 | 0 | X | X | 1 |
| 19 | 0 | 0 | 0 | 0 | | 0 | 0 | 0 | 1 | 1 |

It is noted from viewing table 2 that with CB13 high, the multiplexer functions in the normal manner (18 bit delay) regardless of the state of CB1, CB2, CB3, CB15 or CB16. This programmable delay in the multiplexer 19 can be serially connected to other delay blocks available in this mode to yield any delay from 2 to 1099 bits in 1 bit increments.

The remaining outputs from the main and independent registers are still available in the PDSR mode and function as in the AWPI mode. Thus the outputs Q1, Q3, Q4, Q5 and Q7 are available in the PDSR mode. It is also noted that CB13 controls outputs Q1 and Q5 as well as the programmable delay in the multiplexer.

In summary the following delay blocks are available in the programmable delay shift register mode. The main shift register 11 with its input SR has its output Q6 to provide a delay of 18 to 522 bits or a delay of 540 bits in increments of 36 bits. The delay is controlled by bits CB4 to CB12 of control word 0. The independent storage register 15 has its input EI and outputs Q7 and Q8 to provide a delay of 468 or 504 bits. The word delay register 18 has its input WD and output Q2 to provide a delay of 18 bits. The register 17 with input DF set to 0 provides a delay of 18 bits. The multiplexer 19 is programmable, as inputs M0 and M1 with an output MX and provides a delay of 2 to 19 bits under control of bits CB1 to 3 and 13 to 16 of control word 1. It will be explained how the control words dictate the programming requirements and operation of the registers in the programmable modes.

As indicated the block diagram for the PDSR mode is shown in FIG. 11. The PR10 is placed in the PDSR mode when bits CB0 and CB14 of the control word 0 (C0) are low and CB17 is high, a timing diagram for the operation for the PDSR mode is shown in FIG. 12.

Referring to FIG. 12, again the clock and the word sync inputs are as previously depicted. The input to the multiplexer is shown as M$\phi$ (to designate either M1 or M0) while the control word is shown as C$\phi$ to indicate that either the M0 or M1 inputs can be selected according to the bits in control word 0. FIG. 12 depicts the output MX of the multiplexer 19 for selectable delays of 2, 3, 17, 18 and 19 bits. As is clear the control word 1 (C1) selects the M0 or M1 as the input to the programmable delay multiplexer which is register 19.

tion of which is extremely well-known, both data and filter coefficient may be complex. As seen in FIG. 13, each stage of delay is provided for in the PDSR mode by accessing a delay stage of the register. The coefficients $a_0$ and $a_5$ are then summed in a summer 110 to derive the filter output. For example, if an 18 bit word length is needed for each data sample and 14 data channels are to be multiplexed through the filter the delay required of the processing register is 504 bits. The hardware configuration of the register is shown in FIG. 14 which is the actual implementation of the FIR filter shown in FIG. 13. Thus as one can see from FIG. 14, three processing registers 120 to 122 are used with two multipliers 123 and 124 in order to obtain a FIR response.

DISCRETE FOURIER TRANSFORM PREPROCESSING MODE (DFT MODE)

The general form of the discrete Fourier Transform is:

$$Y_n = \sum_{m=o}^{M-1} X_m e^{jmn\left(\frac{2\pi}{M}\right)}$$

Where M is the width of the transform, n is the sample number and Zm data and $e^{ja}$ are complex. The type of logic required to perform the non-multiplicative component of a discrete Fourier transform consists of data storage, transfer and summation devices. To perform all of the non-multiplicative or preprocessing steps, a great deal of data movement and summation is necessary. As can be seen from the general equation, this characteristic comes about because each output from a discrete Fourier transform calculation requires the sum combination of every input term. This data movement and summation situation is especially acute in implementations which attempt to minimize the number of multiplications done by the discrete Fourier transform. In this case, data to be multiplied by related coefficients are pre-processed to reduce the number of multiplications involved. For example, the equation $Y = A \times C + Bx - C$ may be rearranged to form the expression $Y = -(A - B) \times C$. The pre-processing of A and B reduces the number of multiplications from two to one.

The Processing Register is capable of performing these non-multiplicative operations. By sending a sequence of control words to the Processing Register, the set of input samples needed to generate the discrete Fourier transform output is loaded into the storage section and then manipulated to perform the correct summations, data movements and outputs.

The Processing Register divides this operation into two parts, the loading frame and the computation frame, therefore taking two frames to complete its operation. During the loading frame, there is no data ready to be output so the outputs are placed in a high-impedance state. During the output frame, the outputs are enabled and data is passed on to the multiplier. Therefore, two Processing Registers can be arranged so that for each frame one Processing Register is in the loading frame and the other is in the computation frame. Their outputs are tied together, as well as, to the inputs to the multiplier and since only one of the Processing Registers has its outputs enabled at any one time, and alternately one Processing Register then the other has its outputs enabled, combining two Processing Registers in this fashion will produce the continuous preprocessing (non-multiplicative operations) for a discrete Fourier transform.

Referring to FIG. 15, there is shown the PR10 operating in the DFT mode. In this mode the processing register performs calculations and orderings needed for preprocessing a 14 point DISCRETE FOURIER TRANSFORM. In addition, the 2 to 1 multiplexer 19 and the independent storage register 15 continue to function as above described in the SR mode.

In the DFT mode inputs SR, WD and SM are ignored. The data input is DF and the DFT outputs are Q0 to Q6. While one frame (504 bits) of information is being entered (loading frame), Q0 to Q6 assume a high impedance condition. These outputs then become valid for the next 504 bits which is designated as an output frame. During the output frame input DF is ignored.

The timing of loading and output process allows two PR modules to drive seven output lines in parallel from one input line. The control words for each PR are offset to allow one to load data while the other is computing data. This process alternates to allow the other to load data while the first PR is producing valid output data. Thus even though two frames are required to process, one frame of data, two PR modules can perform continuous processing with a 504 bit delay from an input frame to its corresponding output frame.

When in the DFT mode the overflow line is set to a logic 1 and should be maintained at a logic 1. A logic 0 at the MSB of the overflow will upset the internal computations in the PR chip.

Referring to FIG. 16, there is shown a block diagram using two processing registers 140 and 141 and a multiplier 142 to operate to solve a discrete fourier transform. The ability of the processing register to perform this operation resides in its unique architecture. This architecture allows the movement of data and calculations with data in the main storage register and allows one to program on a word by word basis. It also allows the preprocessed data to be routed to different outputs of the computation register 13 again under control of the control register 14. It is this control of internal data and computations that allows the processing register to perform the types of preprocessing needed for the discrete fourier transform and also allows the integration of the other four modes into basically the same hardware. The main storage register, computation register and control register thus combine an efficient structure capable of satisfying the various needs of different digital signal processing configurations and can be arranged to perform these functions by applying the appropriate control word. This capability coupled with the additional multiplexer, adder/subtractor, word delay and independent storage register provides an extremely useful and versitile tool for digital signal processing needs.

As described above, the programming of the entire processing register is a function of the control words 0 and 1. The control words with other requisite bits are shown in tables 1, 2. It is of course understood by one skilled in the art how the control words can be decoded to provide the various operations described. Therefore, based on the above description together with the timing diagrams, the implementation of the processing register will be known to those skilled in the art.

Essentially, the control word 0 (C0) consists of 18 bit words synchronized with word sync and entered serially into the PR chip. The timing relationship between C0 and other signals on the chip are shown in the timing diagram of FIG. 2. The functions controlled by each bit are interdependent and vary according to the mode of operation. Setting the control word and all bits thereof to a logic 1 places the PR processing chip in the shift register or SR mode.

As indicated, bits CB4 to CB12 in control word 0 can be altered according to table 1 to change the mode of operation from the SR mode to the TSI mode. This allows for selectable delays at the Q6 output of the main shift register 11. All other bits in C0 remain at logic 1.

For the AWPI mode the following control bits settings are used. CB0 set to logic 0, CB14 set to logic 1, CB17 set to logic 1. The bits CB4 to CB12 can again be set for a desired delay according to table 1. CB13 controls the AWPI functions as explained above. In the AWPI mode the logic state of bits CB1, CB2, CB3, CB15 and CB16 can be either a 0 or a 1, as the logic does not care.

The delay shift register mode (PDSR) is selected by the C0 settings are as follows: In this mode CB0 and CB14 are set to a logic 0, CB17 is set to a logic 1. The bits CB4 to CB12 are again set for a desired Q6 delay according to table 1 and as in the AWPI mode. Bits CB1 to CB3, CB13, CB15 and CB16 are set for a desired 2 to 19 bit programmable delay according to Table 3.

The DFT mode control words C0 are predefined for a loading frame and a computation frame.

In the DFT mode, an input control word will effect the PR chip functions on the next word of data as defined by the word sync signal.

As explained above, the control word 1 (C1) controls the input selection for the one of two multiplexer. Only the most significant bit of each 18 bit word is used for selection. All other bits are ignored. A 0 in the MSB of C1 indicates that input M0 will be selected during the next word while a 1 selects input M1. As indicated all arithmetic operations are performed in two's complement arithmetic.

This is so as all data computations and control in the processing register are synchronized with a common clock and word sync. Changes of state occur on the rising edge of the clock. The relationship between the clock, word sync, control words, input and output data and the overflow signal is shown in FIG. 2. Thus the state of low word sync WS defines the most significant bit of each word and WS must be at a logic 1 during all other bits in the word. The control words 0 and 1 are inputted to the processing register and are synchronized by the clock and word sync. Thus as seen from the timing diagram each control word effects the operation of the processing register during the following word as defined by the word sync. The overflow input is valid only when WS is low. The logic 0 during the MSB of OF defines the overflow condition. All other bits in each word of $\overline{OF}$ have no effect on the processing register operation.

FIGS. 3A to 3C and 4A to 4C are the timing diagrams which show the relationships and effects of the overflow signal. To give one an example of the logic format as defined above without resorting to a complicated schematic diagram of each and every module the timing diagrams are deemed sufficient.

It is the selection of the control words and the arrangement of the registers as well as the various delays selected at the output which enable this processing register to operate in a digital processing system in a unique and efficient manner. Such operation affords the digital designer great versitility in implementing complicated digital systems which presently require an excessive amount of individual integrated circuits and additional hardware. For example, of such utility and use reference is now made to the following block diagrams which show the processing register depicted in FIG. 1 for example, operating in conjunction with other modules to implement digital signal processing.

The logic and structure necessary for complete operation of the word processor and the various modules contained therein can be implemented in a number of ways based on the above timing diagrams as well as, the above description.

As one can ascertain, each bit of every word is available including each bit of every data word and each bit of every control word. Thus one can isolate for example, CB13 of control word 0 or any bit. This can be implemented by the use of a bit counter which receives the clock pulses and counts the same and hence maintains an accurate count of each bit in an 18 bit word.

The bit counter can be synchronized or reset by a strobe derived from the word sync signal. In this manner any control bit can be gated out from any word. Thus, the control bit 13 can be isolated to cause the necessary control in the AWPI mode as above described. Thus based on the above description the logic implementation of the entire processing register can be implemented by digital logic circuitry of conventional design. The interconnection of the various registers and modules enables one to accomodate each of the above described modes in a single unit which unit can be fabricated as a complete integrated circuit chip as described above.

The format depicted and described in the block diagrams as FIG. 1 for example, enables one to minimize the number of input and output leads necessary for complete operation in any of the above described modes. This enables great flexibility as compared to prior art processing registers of various types. One skilled in the art will now recognize the tremendous versatility of the processing register which because of its format will enable a designer to specify and construct extremely complicated digital filters with high order responses, as well as many other complicated digital processing systems and components of such systems due to the unique versatility of this register.

We claim:
1. A processing register apparatus for use in digital signal processing applications, said register capable of operating in a plurality of different modes in conjunction with a multiplier to perform digital signal processing blocks and/or systems, the said processing register is to comprise but not limited to:
 (a) main shift register means having a plurality of stages for receiving and storing therein a given number of bits manifesting a plurality of digital data words each having a smaller number of bits of a given value, said register adapted to receive at an input a digital data signal manifesting said plurality of digital words, and to provide said words at output;
 (b) control register means coupled to said main register means having a plurality of stages and adapted to receive a control word of said given value of bits with predetermined bits indicative of any one of given number of modes of operation for said register and with predetermined selected ones of said bits indicative of control signals for selecting any one stage of said main shift register manifesting a given delay according to said selected stage;
 (c) a storage register having a plurality of stages for receiving and storing therein a different number of given bits than said main register, manifesting a smaller plurality of digital data words each of the same number of bits of said given value and
 overflow means coupled to said main and storage registers to set said given value of bits indicative of any digital word stored to one binary logic value in either said main or second storage registers;
 mode selector means coupled to said control register and responsive to said bits to provide a plurality of control signals indicative of a separate mode of operation for said processing register.

2. The processing register according to claim 1 further comprising:
 a multiplexer register having a first input for receiving digital words of said given bit value and a second input for receiving second digital words of said given bit value said register having a number of stages at least equal to said given value of bits,
 logic means coupled to said multiplexer register and adapted to receive a control word of said given bit value with the most significant bit of said control word selecting either said first or said second input word as an output at a given delay with respect to said selected input.

3. The processing register according to claim 2 further comprising:
 a sum and difference register having one input for receiving a digital word of said given number of bits indicative of a sum input and a second input for receiving a digital word of said given number of bits indicative of a difference input to provide at one output a first signal indicative of the sum of said words and a second output to provide a second signal indicative of the difference of said words.

4. The processing register according to claim 3 wherein in a first mode (SR) as determined by said bits said main register provides a first predetermined number of fixed delay outputs, with said storage register providing a second predetermined number of delay outputs and with said multiplexer register and said sum and difference registers operative to provide said multiplexed output and said sum and difference outputs with said first mode indicative of said first predetermined number of bits all being at the same logic value.

5. The processing register according to claim 3 wherein a second mode (AWPI) indicative of said predetermined number of bits manifesting a particular code wherein only certain of said bits are at the same logic value said multiplexer register operation is inhibited, with one of said bits of said first predetermined number of bits operative via logic means to couple the difference output of said sum and difference register to said multiplexer to provide said difference output at said multiplexer output with said given delay and means responsive to said second mode being selected and responsive to said logic state of said bits to vary the delay at least one output of said main shift register.

6. The processing register according to claim 3 wherein in a third mode (PDSR) indicative of said predetermined number of bits manifesting a second code wherein only certain other bits are at the same logic value, said logic means associated with said multiplexer adapted to respond to said control word to decode said bits of said control word to provide a plurality of selectable delays according to said control word.

7. The processing register according to claim 3 wherein in a fourth mode (DFT) indicative of a predetermined number of bits manifesting a code wherein only certain other bits are at the same logic value, the input to said processing register is coupled to the difference input of said sum and difference register for a first input frame indicative of a given number of digital words and hence at given number of bits, and for disabling said coupling during a second frame of the same number of bits indicative of an output frame, with said control word varying logic states to order the input data as applied to said difference input during said fourth mode, and means for inhibiting said overflow means during said fourth mode.

8. The processing register according to claim 3 wherein said sum and difference register performs sums and difference in two's complement binary arithmetic.

9. The processing register according to claim 1 further including:
a word delay register having an input for receiving digital words each of a given number of bits and an output for delaying each received word by said given number of bits.

10. The processing register according to claim 11 further including means responsive to said fourth mode for inhibiting said word delay register operation only during said fourth mode.

11. The processing register according to claim 1 wherein said control register means is serial, in, parallel out shift register.

12. A processing register for use in digital processing systems such as digital filters, transmultiplexers and the like, said register capable of operating in any one of given number of modes, comprising in combination:
(a) a main storage register having a plurality of stages for receiving & storing therein a given number of bits manifesting a plurality of digital data words each of a smaller number of bits of a given value, said register adapted to receive at an input a digital data signal manifesting a plurality of digital words,
(b) a computation register coupled to said storage register and adapted to select any one of said plurality of stages to provide at outputs said digital words at predetermined delays according to said stage selected,
(c) a control register coupled to said storage register and said computation register and adapted to receive a first control word of said given value of bits, with certain of said bits indicative of anyone of said given number of modes, and others of said bits indicative of a desired delay for selecting said stage of said main register,
(d) an independent storage register having a plurality of stages less than said main register and adapted to receive a separate digital input signal manifesting a plurality of separate digital words each of said given value of bits,
(e) overflow means coupled between said main and independent registers and responsive to an overflow signal to cause all bits of any one word stored in either register to be altered to one logic state,
(f) a multiplexer register having a first and a second input each adapted to receive digital words of said given bit value,
(g) logic means coupled to said multiplexer and adapted to receive a second control word of said given bit value, wherein one bit of said word is operative to select said first or second input and to apply the same to an output of said multiplexer,
(h) an adder-subtractor register having a sum input and a difference input each adapted to receive digital data words of said given bit value to provide at a first sum output the sum of said words and at a second difference output the difference of said words, and
(i) logic means responsive to other bits in said first control word for decoding a given number of states each indicative of one of said operating modes for modifying operation of selected ones of said registers according to said selected mode as manifested by said other bits in said first control word.

13. The processing register combination according to claim 12 wherein a first mode (SR) said main shift register provides a plurality of fixed delays as selected by said computation register, with said instruction register providing a lesser plurality of fixed delays from input data to output.

14. The processing register combination according to claim 12 wherein a second mode (TSI) said main shift register provides a selectable delay according to said other bits of said control word.

15. The processing register combination according to claim 14 wherein in a third mode (AWPI) said main shift register provides a selectable delay as in said second mode, with said multiplexer register inputs inhibited and the difference output of said sum and difference register coupled to said multiplexer to provide at the output of said multiplexer a difference signal under control of one bit of said first control word at a selectable delay.

16. The processing register combination according to claim 12 wherein a fourth mode (PDSR) the main and independent registers operate as in said third mode with said multiplexer register responsive to bits of said second control words as decoded by said logic means to provide a selectable delay between any one of said inputs and said output according to the status of second control word.

17. The processing register combination according to claim 12 wherein a fifth mode (DFT) the input to said main register is coupled to the difference output of said sum and difference register for a first input frame of a given number of bits manifesting a given number of digital words and for disabling said coupling during a second frame of the same number of bits indicative of an output frame, with said first control word varying logic states to order input data as applied to the difference input of said sum and difference register during said fifth mode and means for inhibiting said overflow means during said fifth mode.

18. The processing register combination according to claim 12 further including a word delay register having an input adapted to receive a stream of digital data words each consisting of said given bit value and for providing a delayed data stream at an output with the delay being a one word delay and therefore equal to the number of said bits of said given value.

* * * * *